(12) United States Patent
Qiu et al.

(10) Patent No.: US 12,314,550 B2
(45) Date of Patent: May 27, 2025

(54) METHOD, APPARATUS, DEVICE AND STORAGE MEDIUM FOR CONTENT PRESENTATION

(71) Applicant: DOUYIN VISION (BEIJING) CO., LTD., Beijing (CN)

(72) Inventors: Hao Qiu, Beijing (CN); Yang Wang, Beijing (CN); Anqi Wang, Beijing (CN)

(73) Assignee: DOUYIN VISION (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/934,909

(22) Filed: Sep. 23, 2022

(65) Prior Publication Data
US 2024/0012546 A1   Jan. 11, 2024

(30) Foreign Application Priority Data

Jul. 7, 2022   (CN) .......................... 202210804268.5

(51) Int. Cl.
*G06F 3/04842*   (2022.01)
*G06T 5/70*   (2024.01)

(52) U.S. Cl.
CPC ............ *G06F 3/04842* (2013.01); *G06T 5/70* (2024.01)

(58) Field of Classification Search
CPC .......................... G06F 3/04842; G06T 5/002
See application file for complete search history.

(56) References Cited

U.S. PATENT DOCUMENTS

| 7,823,056 | B1 | 10/2010 | Davey et al. |
| 8,665,333 | B1 | 3/2014 | Sharma |
| 8,765,113 | B2 | 7/2014 | Lewandowski et al. |
| 8,953,079 | B2 | 2/2015 | Raju et al. |
| 9,325,889 | B2 | 4/2016 | Desai et al. |
| 9,325,903 | B2 | 4/2016 | Kim et al. |
| 9,349,414 | B1 | 5/2016 | Furment |

(Continued)

FOREIGN PATENT DOCUMENTS

| CN | 101388988 A | 3/2009 |
| CN | 102568260 A | 7/2012 |

(Continued)

OTHER PUBLICATIONS

Non-Final Office Action dated Aug. 22, 2023 in U.S. Appl. No. 18/195,809 (9 pages).

(Continued)

*Primary Examiner* — Jeremy L Stanley

(57) ABSTRACT

According to embodiments of the present disclosure, there is provided a method, apparatus, device and storage medium for content presentation. The method comprises based on a first user input received in a graphical user interface, the first user input indicating to present a first content associated with a second user to a first user in the graphical user interface, determining whether the first user has provided the second content. The method further comprises in accordance with a determination that the first user does not provide the second content, presenting a blurred image associated with the first content to the first user in the graphical user interface. In this way, a more flexible content sharing application or content presentation application can be provided.

14 Claims, 18 Drawing Sheets

(56) References Cited

U.S. PATENT DOCUMENTS

| | | | |
|---|---|---|---|
| 9,491,367 B2 | 11/2016 | Lee et al. | |
| 9,509,916 B2 | 11/2016 | Li et al. | |
| 9,565,333 B2 | 2/2017 | Kim et al. | |
| 9,578,233 B2 | 2/2017 | Aoyama et al. | |
| 9,591,209 B2 | 3/2017 | Kim et al. | |
| 9,804,760 B2 | 10/2017 | Cunningham et al. | |
| 10,007,476 B1 | 6/2018 | Glikmann | |
| 10,136,069 B2 | 11/2018 | Kim et al. | |
| 10,148,886 B2 | 12/2018 | Kim et al. | |
| 10,200,599 B1 | 2/2019 | Baldwin | |
| 10,652,198 B1* | 5/2020 | Morrison | H04L 51/212 |
| 10,693,956 B1* | 6/2020 | Green | H04L 63/0428 |
| 10,944,908 B2 | 3/2021 | An et al. | |
| 11,115,591 B2 | 9/2021 | Wei | |
| 11,115,598 B2 | 9/2021 | Yim | |
| 11,258,736 B2* | 2/2022 | Shelley | H04L 51/10 |
| 11,386,625 B2 | 7/2022 | Hu et al. | |
| 11,412,276 B2 | 8/2022 | Bloch et al. | |
| 11,470,051 B1* | 10/2022 | Berkas | H04L 51/52 |
| 11,849,210 B2 | 12/2023 | Jiang et al. | |
| 12,120,424 B2 | 10/2024 | Yang et al. | |
| 2004/0179816 A1 | 9/2004 | Takehana | |
| 2005/0232586 A1 | 10/2005 | Tsuchiya | |
| 2009/0141981 A1 | 6/2009 | Chan | |
| 2010/0077289 A1 | 3/2010 | Das et al. | |
| 2010/0251109 A1* | 9/2010 | Jin | H04N 1/444 715/273 |
| 2010/0281375 A1 | 11/2010 | Pendergast | |
| 2011/0194010 A1 | 8/2011 | Nakase et al. | |
| 2011/0249073 A1 | 10/2011 | Cranfill et al. | |
| 2012/0081392 A1 | 4/2012 | Arthur | |
| 2012/0120186 A1 | 5/2012 | Diaz et al. | |
| 2012/0268552 A1 | 10/2012 | Choi et al. | |
| 2012/0274796 A1 | 11/2012 | Choi et al. | |
| 2012/0274808 A1 | 11/2012 | Chong et al. | |
| 2013/0111366 A1* | 5/2013 | Silbey | A63F 13/795 715/757 |
| 2013/0125000 A1 | 5/2013 | Fleischhauer | |
| 2013/0227414 A1 | 8/2013 | Hwang et al. | |
| 2013/0235071 A1 | 9/2013 | Ubillos et al. | |
| 2013/0235224 A1 | 9/2013 | Park et al. | |
| 2013/0298026 A1 | 11/2013 | Fitzpatrick | |
| 2013/0328997 A1 | 12/2013 | Desai | |
| 2013/0329100 A1 | 12/2013 | Desai et al. | |
| 2014/0047371 A1 | 2/2014 | Palmer | |
| 2014/0192212 A1 | 7/2014 | He et al. | |
| 2014/0229544 A1* | 8/2014 | Evans | H04L 63/102 709/204 |
| 2014/0232904 A1 | 8/2014 | Na et al. | |
| 2014/0232906 A1 | 8/2014 | Ha et al. | |
| 2014/0240551 A1 | 8/2014 | Kim et al. | |
| 2014/0267842 A1 | 9/2014 | Lee et al. | |
| 2014/0324605 A1* | 10/2014 | Steelberg | G06Q 30/0277 705/14.73 |
| 2015/0062434 A1 | 3/2015 | Deng et al. | |
| 2015/0163562 A1 | 6/2015 | Leventhal | |
| 2015/0277638 A1* | 10/2015 | Bustamante | G06F 3/0412 345/173 |
| 2015/0288742 A1* | 10/2015 | Flynn | G06Q 50/01 709/217 |
| 2015/0363811 A1* | 12/2015 | Candillier | G06Q 30/0217 705/14.19 |
| 2016/0007008 A1 | 1/2016 | Molgaard et al. | |
| 2016/0198086 A1 | 7/2016 | Kim et al. | |
| 2016/0224767 A1* | 8/2016 | Steelberg | G06F 21/10 |
| 2016/0248864 A1* | 8/2016 | Loia | G06Q 50/01 |
| 2016/0249108 A1 | 8/2016 | Sexton | |
| 2016/0284383 A1 | 9/2016 | Kozakura | |
| 2016/0366294 A1 | 12/2016 | Uroskin et al. | |
| 2017/0064208 A1 | 3/2017 | Salimpour et al. | |
| 2017/0085803 A1 | 3/2017 | Chin et al. | |
| 2017/0094019 A1 | 3/2017 | Ahmed et al. | |
| 2017/0180649 A1 | 6/2017 | Kim et al. | |
| 2017/0195615 A1 | 7/2017 | Han et al. | |
| 2017/0201714 A1 | 7/2017 | Kim et al. | |
| 2017/0256288 A1 | 9/2017 | Al et al. | |
| 2017/0289462 A1 | 10/2017 | Eum et al. | |
| 2017/0337652 A1* | 11/2017 | Sarin | H04N 1/4493 |
| 2018/0033153 A1 | 2/2018 | Hirasawa et al. | |
| 2018/0227489 A1 | 8/2018 | Ho | |
| 2018/0234589 A1* | 8/2018 | Xiao | G06F 21/60 |
| 2018/0376078 A1 | 12/2018 | Adachi et al. | |
| 2019/0005253 A1* | 1/2019 | Floury | G06F 3/04883 |
| 2019/0014372 A1 | 1/2019 | Kandagal et al. | |
| 2019/0019926 A1 | 1/2019 | Lee et al. | |
| 2019/0075066 A1* | 3/2019 | Cho | H04L 51/18 |
| 2019/0087938 A1* | 3/2019 | Iddings | G06T 3/4038 |
| 2019/0174056 A1 | 6/2019 | Jung et al. | |
| 2019/0199926 A1 | 6/2019 | An et al. | |
| 2019/0288972 A1* | 9/2019 | Morrison | H04L 51/52 |
| 2019/0342616 A1* | 11/2019 | Domm | G06Q 50/01 |
| 2020/0099838 A1 | 3/2020 | Song et al. | |
| 2020/0106952 A1 | 4/2020 | Missig et al. | |
| 2020/0223454 A1* | 7/2020 | Fox | B60W 60/00139 |
| 2020/0302414 A1* | 9/2020 | Pachera | G06Q 50/01 |
| 2021/0014415 A1 | 1/2021 | Wei | |
| 2021/0026511 A1 | 1/2021 | Ye et al. | |
| 2021/0027576 A1 | 1/2021 | Nelson et al. | |
| 2021/0051295 A1 | 2/2021 | Khawam | |
| 2021/0067741 A1 | 3/2021 | Yoshizawa et al. | |
| 2021/0099407 A1 | 4/2021 | Al Majid et al. | |
| 2021/0152753 A1 | 5/2021 | Zhu | |
| 2021/0297604 A1 | 9/2021 | Matiossian | |
| 2022/0101608 A1 | 3/2022 | Hu et al. | |
| 2022/0159183 A1 | 5/2022 | Li et al. | |
| 2022/0239832 A1* | 7/2022 | Tyagi | H04N 13/239 |
| 2022/0294992 A1 | 9/2022 | Manzari et al. | |
| 2022/0321795 A1 | 10/2022 | Jiang et al. | |
| 2022/0377254 A1 | 11/2022 | Wang et al. | |
| 2023/0007085 A1* | 1/2023 | Berliner | G06V 30/14 |
| 2023/0076870 A1* | 3/2023 | Arnold | G06F 9/451 |
| 2023/0088720 A1* | 3/2023 | Wang | G06F 21/60 |
| 2023/0343004 A1 | 10/2023 | Goodrich et al. | |

FOREIGN PATENT DOCUMENTS

| | | |
|---|---|---|
| CN | 102938825 A | 2/2013 |
| CN | 103745736 A | 4/2014 |
| CN | 104104870 A | 10/2014 |
| CN | 104980659 A | 10/2015 |
| CN | 105009566 A | 10/2015 |
| CN | 113422903 A | 10/2015 |
| CN | 105103535 A | 11/2015 |
| CN | 105376396 A | 3/2016 |
| CN | 106060526 A | 10/2016 |
| CN | 106165430 A | 11/2016 |
| CN | 106210629 A | 12/2016 |
| CN | 106231095 A | 12/2016 |
| CN | 106559686 A | 4/2017 |
| CN | 106662965 A | 5/2017 |
| CN | 106851162 A | 6/2017 |
| CN | 106973234 A | 7/2017 |
| CN | 107105315 A | 8/2017 |
| CN | 107509029 A | 12/2017 |
| CN | 107566725 A | 1/2018 |
| CN | 107846547 A | 3/2018 |
| CN | 107911614 A | 4/2018 |
| CN | 108419016 A | 8/2018 |
| CN | 109089059 A | 12/2018 |
| CN | 109151537 A | 1/2019 |
| CN | 109167937 A | 1/2019 |
| CN | 110166652 A | 8/2019 |
| CN | 110740261 A | 1/2020 |
| CN | 110784674 A | 2/2020 |
| CN | 110809100 A | 2/2020 |
| CN | 110830714 A | 2/2020 |
| CN | 111143662 A | 5/2020 |
| CN | 111435092 A | 7/2020 |
| CN | 112004032 A | 11/2020 |
| CN | 112445389 A | 3/2021 |
| CN | 306373989 S | 3/2021 |
| CN | 113497894 A | 10/2021 |
| CN | 110784674 B | 3/2022 |

(56) References Cited

FOREIGN PATENT DOCUMENTS

| CN | 114513705 A | 5/2022 |
|---|---|---|
| CN | 115334246 A | 11/2022 |
| EP | 1841225 A3 | 10/2007 |

OTHER PUBLICATIONS

International Search Report dated Jan. 11, 2021 in PCT Appl. No. PCT/CN2020/124038, English translation (4 pages).
International Search Report dated Feb. 2, 2021 in PCT Appl. No. PCT/CN2020/124036, English translation (3 pages).
International Search Report dated Oct. 16, 2023 in PCT Appl. No. PCT/CN2023/105064, English translation (9 pages).
International Search Report dated Oct. 17, 2023 in PCT Appl. No. PCT/CN2023/105002, English translation (9 pages).
International Search Report dated Nov. 20, 2023 in PCT Appl. No. PCT/CN2023/116256, English translation (10 pages).
Non-Final Office Action dated Apr. 12, 2023 in U.S. Appl. No. 17/773,573 (24 pages).
Final Office Action dated Nov. 16, 2022 in U.S. Appl. No. 17/733,958 (18 pages).
Non-Final Office Action dated Oct. 5, 2023 in U.S. Appl. No. 17/733,958 (23 pages).
Non-Final Office Action dated Feb. 17, 2023 in U.S. Appl. No. 17/733,958 (21 pages).
Office Action dated Oct. 20, 2020 in CN Appl. No. 201911047107.0, English translation (16 pages).
Office Action dated Apr. 20, 2021 in CN Appl. No. 201911047107.0, English translation (21 pages).
Office Action dated Feb. 2, 2021 in CN Appl. No. 201911047128.2, English translation (22 pages).
Second Office Action dated Nov. 29, 2023 in CN Appl. No. 202211086344.X, English translation (21 pages).
Office Action dated Nov. 17, 2022 in IN Appl. No. 202227025132, English translation (7 pages).
Office Action dated Feb. 2, 2021 in CN Appl. No. 201911047141.8, English translation (24 pages).
Office Action dated May 25, 2023 in CN Appl. No. 202211086344.X, English translation (20 pages).
Final Office Action dated Dec. 21, 2023 in U.S. Appl. No. 17/733,958 (26 pages).
Android implements a View style (example demo) that follows the finger drag and automatically borders, Jan. 13, 2017, https://m.jb51.net/article/102952.htm, English translation (20 pages).
Non-Final Office Action mailed on Mar. 18, 2024, for U.S. Appl. No. 18/398,056, pp. 36.
First Office Action for Chinese Patent Application No. 202210803525.3, mailed Jun. 28, 2024, 10 pages.
Second Office Action for Chinese Application No. 202210803525.3, mailed on Nov. 27, 2024, 12 pages.
Office action received from Chinese patent application No. 202211086344.X mailed on Jan. 26, 2025, 10 pages (4 pages English Translation and 6 pages Original Copy).
Non-Final Office Action mailed on Feb. 5, 2025, for U.S. Appl. No. 18/745,669, pp. 22.
Notice of Allowance mailed on Jan. 15, 2025, for U.S. Appl. No. 18/679,238, pp. 14.
Notice of Allowance for U.S. Appl. No. 18/679,238, mailed Mar. 21, 2025, 43 pages.

* cited by examiner

METHOD, APPARATUS, DEVICE AND STORAGE MEDIUM FOR CONTENT PRESENTATION

CROSS-REFERENCE TO RELATED APPLICATIONS

This application claims priority to Chinese Patent Application No. 202210804268.5 filed with the China National Intellectual Property Administration (CNIPA) on Jul. 7, 2022, the disclosure of which is incorporated herein by reference in its entirety.

TECHNICAL FIELD

Example embodiments of the present disclosure generally relate to the computer field, and specifically, to a method, apparatus, device and computer-readable storage medium for content presentation.

BACKGROUND

More content presentation applications or content sharing applications are currently designed to provide various services to users. Users may perform various operations on these applications. For example, users may create and post various kinds of content, including multimedia content such as videos, pictures, picture sets, sounds, and so on. Users may further perform various operations such as browsing, commenting, reposting and message interaction in these applications. Sometimes, users may perform various operations in the content presentation or sharing application under some conditions.

SUMMARY

In a first aspect of the present disclosure, a method for content presentation is provided. The method comprises based on a first user input received in a graphical user interface, the first user input indicating to present a first content associated with a second user to a first user in the graphical user interface, determining whether the first user has provided a second content. The method further comprises in accordance with a determination that the first user does not provide the second content, presenting a blurred image associated with the first content to the first user in the graphical user interface.

In a second aspect of the present disclosure, an electronic device is provided. The device comprises: at least one processing unit; a display device; and at least one memory, coupled to the at least one processing unit and storing instructions to be executed by the at least one processing unit. The instructions, when executed by the at least one processing unit, cause the device to based on a first user input received in a graphical user interface displayed in the display device, the first user input indicating to present a first content associated with a second user to a first user in the graphical user interface, determine whether the first user has provided a second content; and in accordance with a determination that the first user does not provide the second content, present a blurred image associated with the first content to the first user in the graphical user interface.

In a third aspect of the present disclosure, a computer-readable storage medium is provided. A computer program is stored on the medium, which, when executed by a processor, implements a method according to the first aspect.

It is to be understood that the Summary is neither intended to identify key features or essential features of the present disclosure, nor is it intended to be used to limit the scope of the present disclosure. Other features of the present disclosure will become easy to understand from the description below.

BRIEF DESCRIPTION OF THE DRAWINGS

Through the more detailed description with reference to the accompanying drawings, the above and other features, advantages and aspects of the present disclosure will become more apparent. Throughout the drawings, the same or similar reference numerals represent the same or similar elements, among which.

DETAILED DESCRIPTION OF EMBODIMENTS

Figure 1:
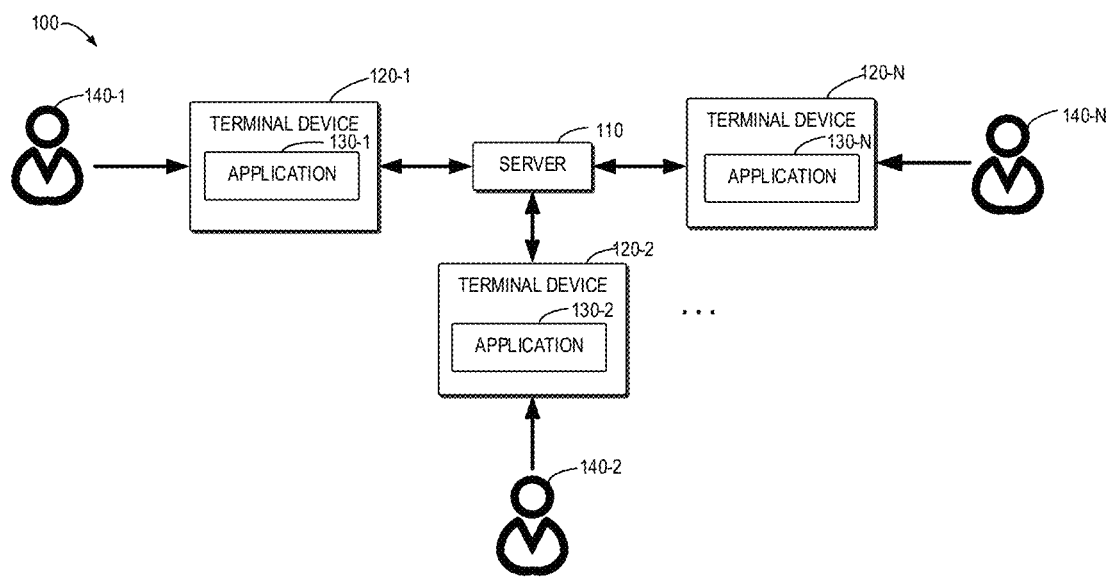
FIG. 1 illustrates a schematic view of an example environment in which embodiments of the present disclosure can be implemented.

Embodiments of the present disclosure will be described in more detail with reference to the accompanying drawings, in which some embodiments of the present disclosure have been illustrated. However, it is to be understood that the present disclosure can be implemented in various manners, and thus should not be construed to be limited to embodiments disclosed herein. On the contrary, those embodiments are provided for the thorough and complete understanding of the present disclosure. It is to be understood that the drawings and embodiments of the present disclosure are merely for the purpose of illustration, rather than limiting the protection scope of the present disclosure.

In the description of the embodiments of the present disclosure, the term "includes" and its variants are to be read as open terms that mean "includes, but is not limited to." The term "based on" is to be read as "based at least in part on." The terms "one embodiment" or "the embodiment" are to be read as "at least one embodiment." The term "some embodiments" is to be read as "at least some embodiments." Other definitions, either explicit or implicit, may be included below.

As used herein, the term "image" may refer to multimedia content such as a still image or picture (e.g., photo), a moving image or picture (e.g., video) and the like. The image may be taken by a single camera or composited from multiple images taken by multiple cameras.

It is to be understood that data involved in the present technical solution (including but not limited to the data itself, the acquisition or use of the data) should comply with requirements of corresponding laws and regulations and relevant rules.

It is to be understood that, before applying the technical solutions disclosed in various embodiments of the present disclosure, the user should be informed of the type, scope of use, and use scenario of the personal information involved in the subject matter described herein in an appropriate manner in accordance with relevant laws and regulations, and user authorization should be obtained.

For example, in response to receiving an active request from the user, prompt information is sent to the user to explicitly inform the user that the requested operation would acquire and use the user's personal information. Therefore, according to the prompt information, the user may decide on his/her own whether to provide the personal information to the software or hardware, such as electronic devices, applications, servers, or storage media that perform operations of the technical solutions of the subject matter described herein.

As an optional but non-limiting implementation, in response to receiving an active request from the user, the way of sending the prompt information to the user may, for example, include a pop-up window, and the prompt information may be presented in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the implementations of the present disclosure. Other methods that satisfy relevant laws and regulations are also applicable to the implementations of the present disclosure.

FIG. 1 shows a schematic view of an example environment 100 in which embodiments of the present disclosure can be implemented. In this example environment 100, terminal device 120-1, terminal device 120-2, . . . , and terminal device 120-N (N is an integer greater than or equal to 1) are installed with application 130-1, application 130-2, . . . , and application 130-N, respectively. For convenience of discussion, terminal devices 120-1, 120-2, . . . , and 120-N, etc. may be collectively or individually referred to as terminal device 120, and applications 130-1, 130-2, . . . , and 130-N, etc. may be collectively or individually referred to as application 130. In some embodiments, the application 130 may be a content sharing application or a content presentation application, and so on.

User 140-1, the user 140-2, . . . and user 140-N may interact with a corresponding application 130 via a corresponding terminal device 120 and/or an attached device of the terminal device 120, respectively. For example, the user 140-1 may interact with the application 130-1 via the terminal device 120-1 and/or an attached device of the terminal device 120-1. For ease of discussion, users 140-1, 140-2, . . . , 140-N, and the like may be collectively or individually referred to as user 140. The application 130 may provide the user 140 with various services related to multimedia content, including browsing, commenting, reposting, creating (e.g., shooting and/or editing), and posting the multimedia content. As used herein, "multimedia content" may be various forms of content, including video, audio, pictures, picture collections, text, and so on.

In the environment 100 of FIG. 1, if the application 130 is in an active state, the terminal device 120 may present a page of the application 130 to the user 140. In some embodiments, the terminal device 120 may be provided with a display device (not shown) or communicatively connected with a display device. The page may be presented in a graphical user interface (GUI) displayed by the display device. For the sake of illustration, unless otherwise specified, pages, windows or other graphic representations described hereinafter may be displayed in the GUI displayed by the display device. In some embodiments, the pages may include various pages that can be provided by the application 130, such as a multimedia content presentation page, a content creation page, a content editing page, a message page, a personal page, a friend page, and the like.

In some embodiments, the terminal device 120 communicates with a server 110 to provide services of the application 130. The terminal device 120 may be any type of mobile terminal, fixed terminal or portable terminal, including mobile phone, desktop computer, laptop computer, notebook computer, netbook computer, tablet computer, media computer, multimedia tablet, personal communication system (PCS) device, personal navigation device, personal digital assistant (PDA), an audio/video player, a digital camera/video camera, a positioning device, a television receiver, a radio broadcast receiver, an electronic book device, a game device, or any combination of the thereof consisting accessories and peripherals of these devices, or any combination thereof. In some embodiments, the terminal device 120 can also support any type of interface (such as a "wearable" circuit, and the like) for the user. The server 110 is various types of computing systems/servers that can provide computing capabilities, including but not limited to mainframes, edge computing nodes, computing devices in a cloud environment, and the like.

It is to be understood that the structures and functions of various elements in the environment 100 have been described only for the purpose of illustration, rather than limiting the scope of the present disclosure. In the environment 100, there may exist any number of servers and any number of terminal devices. Different terminal devices may communicate with the same or different servers.

As mentioned above, more content sharing applications or content presentation applications are designed to provide various services to users. For example, users can use content sharing applications to create and post various kinds of content, including multimedia content such as videos, pictures, picture collections, and sounds. In addition, users can also browse, comment, repost, and interact with other users' content in the content sharing application. Sometimes, users may perform various operations in the content sharing application under some conditions.

In the conventional scheme of some content sharing applications, it is usually determined whether the user can perform operations such as browsing and commenting on the content posted by other users only based on the friend relationships between users. In addition, in some conventional content sharing applications, if a user does not have permission to view the shared content posted by another user, the user usually cannot see any information about the shared content of another user.

According to embodiments of the present disclosure, it is proposed a solution for content sharing. In this solution, if a user wants to view the content shared by another user, it needs to determine whether the user has shared the content himself or herself If the user does not share the content, he or she can only see a blurred image of the shared content of the other user, but cannot see the content shared by the other user. In this way, the user's participation and experience can be improved through this flexible content sharing solution.

Some example embodiments of the present disclosure will be described with reference to the drawings below.

Figure 2:
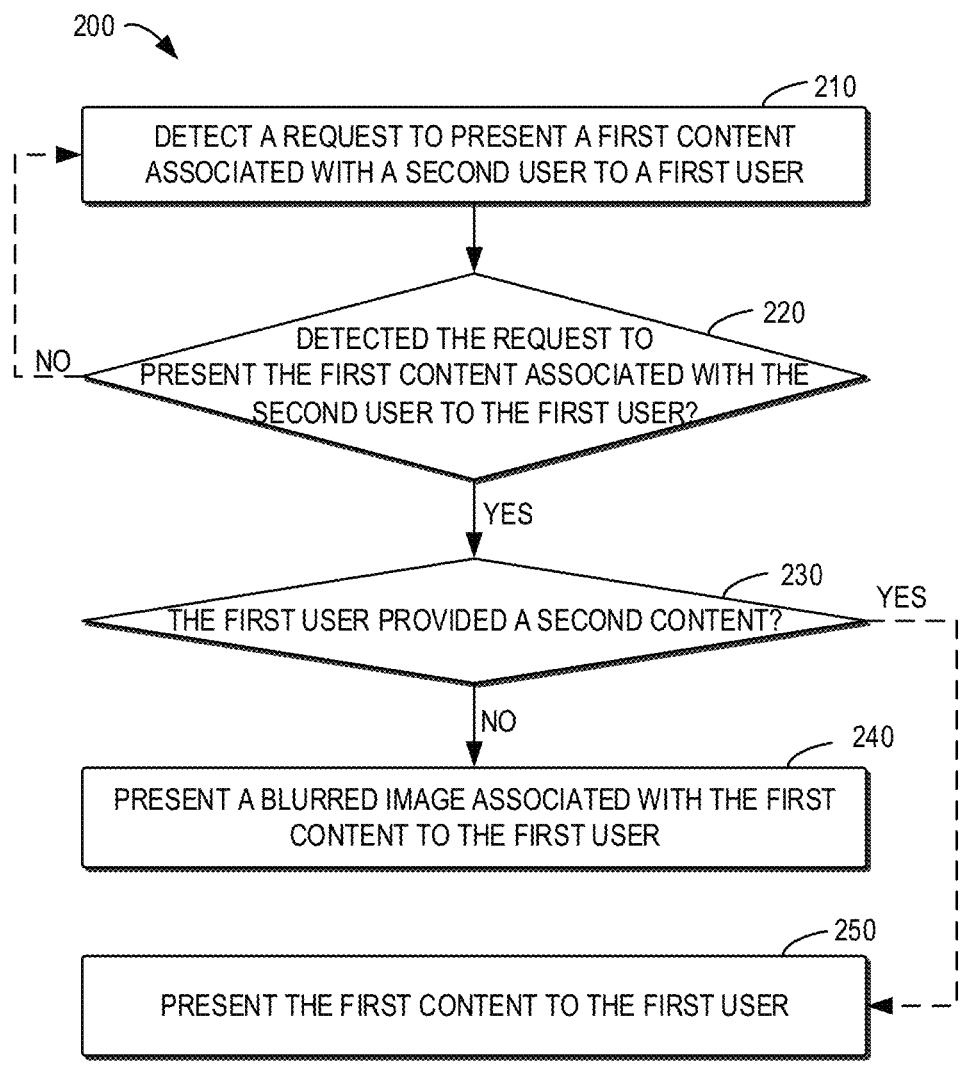
FIG. 2 illustrates a flowchart of a process for content presentation according to some embodiments of the present disclosure.

FIG. 2 illustrates a flowchart of a process 200 for content presentation according to some embodiments of the present disclosure. The process 200 can be implemented at the terminal device 120. For the sake of discussion, the process 200 will be described with reference to the environment 100 of FIG. 1. It is to be understood that the process 200 may include an additional act which is not shown and/or omit an act which is shown, and the scope of the present disclosure is not limited in this regard.

At block 210, the terminal device 120 detects a user input in a graphical user interface (GUI). The user input indicates to present the first content associated with the user 140-2 (also referred to as the second user) to the user 140-1 (also referred to as the first user). The user input may be inputted by the first user. As used herein, the user input may also be referred to as a "first user input" or a "request". In some embodiments, the first content may include multimedia content, including but not limited to video, audio, pictures, picture sets, dynamic pictures, text, and the like. Embodiments of the present disclosure are not limited in this respect.

In some embodiments, the terminal device 120 is provided with a display device (not shown). Alternatively, or in addition, in some embodiments, the terminal device 120 is communicatively connected to a display device (not shown). The user input may be received in a GUI displayed in the display device.

In some embodiments, the first content associated with the user 140-2 may be presented to the user 140-1 in various situations. In other words, a user input or request to present the first content associated with the user 140-2 to the user 140-1 may be detected in different situations. For example, the user 140-1 may search the page of the application 130-1 for the user 140-2 and access the content shared by the user 140-2. The page of the application 130-1 may be presented in the GUI. In this case, the terminal device 120 will detect a request to present the first content associated with the user 140-2 to the user 140-1. For another example, the user 140-1 may also access the content shared by the user 140-2 in the media stream pushed by the application 130-1 by, for example, turning up and down pages or sliding a finger. An example in which the user 140-1 accesses the content shared by the user 140-2 in the media stream will be described below with reference to FIG. 3B. In such an example of accessing the first content in the media stream, the terminal device 120 will detect a request to present the first content associated with the user 140-2 to the user 140-1.

In some embodiments, the user 140-1 may receive reposting or sharing information corresponding to the first content. The reposting or sharing information may be a link reposted or shared by other users to the user 140-1, and the link points to the first content shared by the user 140-2. The user 140-1 may request to view the content by clicking the link.

Alternatively, or in addition, the user 140-1 may also receive system information corresponding to the first content. For example, the user 140-1 may receive system information about content shared by other users on the home screen page, lock screen page, or any other active page of the terminal device 120. For example, the system information may indicate that the user 140-2 has posted the first content. The user 140-1 may request to view the content by clicking the system information. In these cases, the terminal device 120 will detect a request to present the first content associated with the user 140-2 to the user 140-1.

Various situations in which the first content associated with the user 140-2 is presented to the user 140-1 have been described above. It is to be understood that the various cases above are merely for the purpose of illustration without suggesting any limitation. The first content associated with the user 140-2 may be presented to the user 140-1 in any suitable situation. In other words, a request to present the first content associated with the user 140-2 to the user 140-1 may be detected in any appropriate cases. Embodiments of the present disclosure are not limited in this respect.

At block 220, the terminal device 120 determines whether a request to present the first content associated with the user 140-2 to the user 140-1 is detected or received. If the terminal device 120 does not receive the above request or user input at block 220, the terminal device 120 may continue to detect the request at block 220. For example, if a request to present the first content is not detected in such as a content presentation page of the application 130 in the GUI, the presentation of the content presentation page may be maintained, and the request may continue to be detected periodically or otherwise. If other commands are detected on this page, corresponding operations can be performed according to the other commands.

If the terminal device 120 receives the user input in the GUI at block 220, the terminal device 120 may determine whether the user has provided the second content at block 230. For example, in response to the user input indicating to present the first content associated with the user 140-2 to the user 140-1, the terminal device 120 may determine whether the user 140-1 has provided the second content. The user 140-1 may share the second content provided by the user 140-1 via the application 130-1. Similar to the first content, the second content may also include multimedia content, including but not limited to video, audio, pictures, picture sets, dynamic pictures, text, and the like. As used herein, for convenience of discussion, the content shared by other users that the user 140-1 wants to view is referred to as "first content", and the content shared by the user 140-1 is referred to as "second content".

In some embodiments, the first and second contents are contents of a same content type. For example, the first and second contents may be both static images (e.g., pictures), both dynamic images (e.g., videos), both composite images, and so on. The composite image may refer to an image composed from a plurality of images (for example, a plurality of pictures or a plurality of videos or a combination thereof). It is to be understood that in some embodiments, the first and second contents may also be contents of different content types. For example, the first content may be a composite image, and the second content may be a single image.

Alternatively, or in addition, in some embodiments, the first and second contents may be posted in response to a same system message. For example, the terminal devices 120 of the user 140-1 and the user 140-2 may receive the same system message at the same time, which indicates the user 140-1 and the user 140-2 to share content. The system message may be presented in the GUI to the user 140.

In some embodiments, the system message may include a prompt of content posting time limit that indicates the user 140 to complete content posting or content sharing within the content posting time limit. For example, the content posting time limit prompt may be "please post the shared content within two minutes". The terminal device 120 may receive a system message containing the prompt of content posting time limit at a same time and present the prompt of content posting time limit to the user 140. The user 140 will know that the content is to be posted within two minutes after seeing the prompt of content posting time limit. It is to be understood that the time limit of two minutes shown above is only for the purpose of illustration without suggesting any limitation. The content posting time limit indicated in the content posting time limit prompt may have any other appropriate time duration.

In some embodiments, the user 140 may post the content only within the time limit indicated by the prompt of content posting time limit. If the time limit is exceeded, the user 140 cannot post the content. Alternatively, or in addition, in some embodiments, the user 140 may still post the content even if the content posting time limit is exceeded. In such an example where the user 140 posted the content later than the content posting time limit, information about the user posting the content later than the content posting time limit may be displayed in the GUI. For example, content such as "4 hours late" may be displayed at an arbitrary position on the presentation page of the content posted by the user. It is to be understood that the time duration such as 4 hours shown above is only for the purpose of illustration without suggesting any limitation.

If the terminal device 120 determines that the user 140-1 does not provide the second content at block 230, the terminal device 120 presents a blurred image associated with the first content to the user 140-1 in the GUI at block 240. In this way, the terminal device 120 may not present the detailed content of the first content to the user 140-1, but only present the blurred image of the first content. For example, the terminal device 120 may present the blurred image associated with the first content to the user 140-1 on the page of the application 130.

Figure 3A:
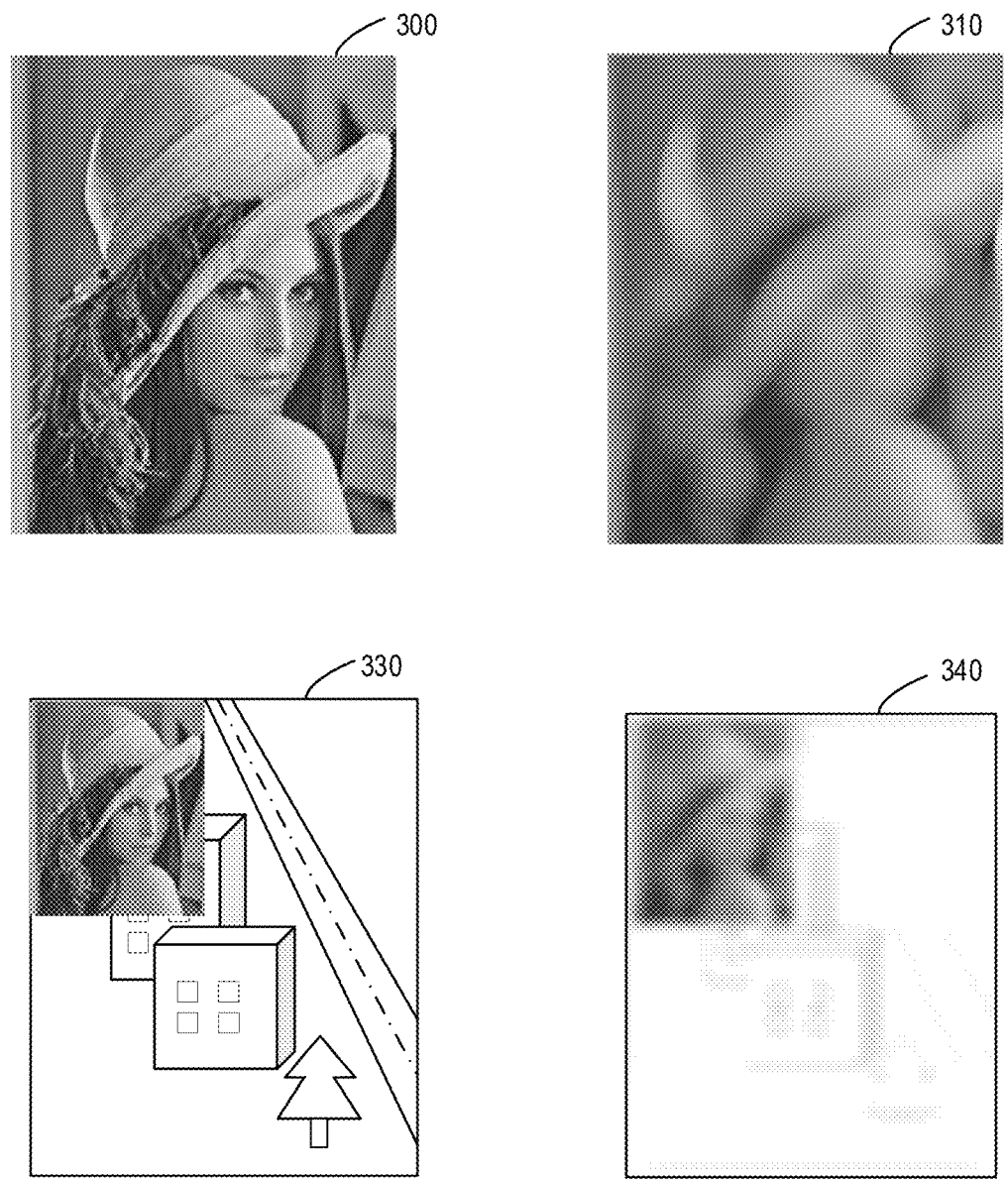
FIG. 3A shows a schematic diagram of a content provided by a user and a blurred image of the content according to some embodiments of the present disclosure.

In some embodiments, the blurred image includes at least a blurred version of the first content obtained by any appropriate blurring or mosaic processing on the first content. FIG. 3A illustrates a schematic diagram of a content provided or shared by a user and a blurred image associated with the content according to some embodiments of the present disclosure. In the example of FIG. 3A, the first content provided by the user 140-2 includes an image 300. By contrast, FIG. 3A also shows a blurred image 310 associated with the image 300. The blurred image 310 includes a blurred version of the image 300.

In some embodiments, the first content provided by the user 140-2 may include a composite content. The composite content may be obtained based on a picture or video taken by using the front camera and a picture or video taken by using the rear camera by the user 140-2. For example, the composite content may include a first image taken by the front camera and a second image taken by the rear camera. The first and second images are composed based on a certain layout and a certain shape. Likewise, the second content provided by the user 140-1 may also include composite content obtained by composing pictures or videos taken by the front camera and the rear camera respectively. In some embodiments, at least one of the first and second contents or both of the first and second contents may include a composite content, such as a composite image.

FIG. 3A also shows a schematic diagram of a composite content shared by a user and a blurred image associated with the composite content according to some embodiments of the present disclosure. For the purpose of illustration, the example of the composite content 330 shown in FIG. 3A is composed of a first image (e.g., picture or video) and a second image (e.g., picture or video). It is to be understood that the layout, shape and size of the first image and the second image in FIG. 3A are only exemplary, and any different layout, shape and size can be used to composite the composite content.

FIG. 3A also shows a blurred image 340 associated with the composite content 330. It can be seen that the blurred image 340 includes a blurred version of the composite content 330. It is to be understood that in some embodiments, the composite content may also be composed from any number of pictures and/or any number of videos. These pictures and/or videos may be captured by the same camera or different cameras. Embodiments of the present disclosure are not limited in this respect.

Figure 3B:
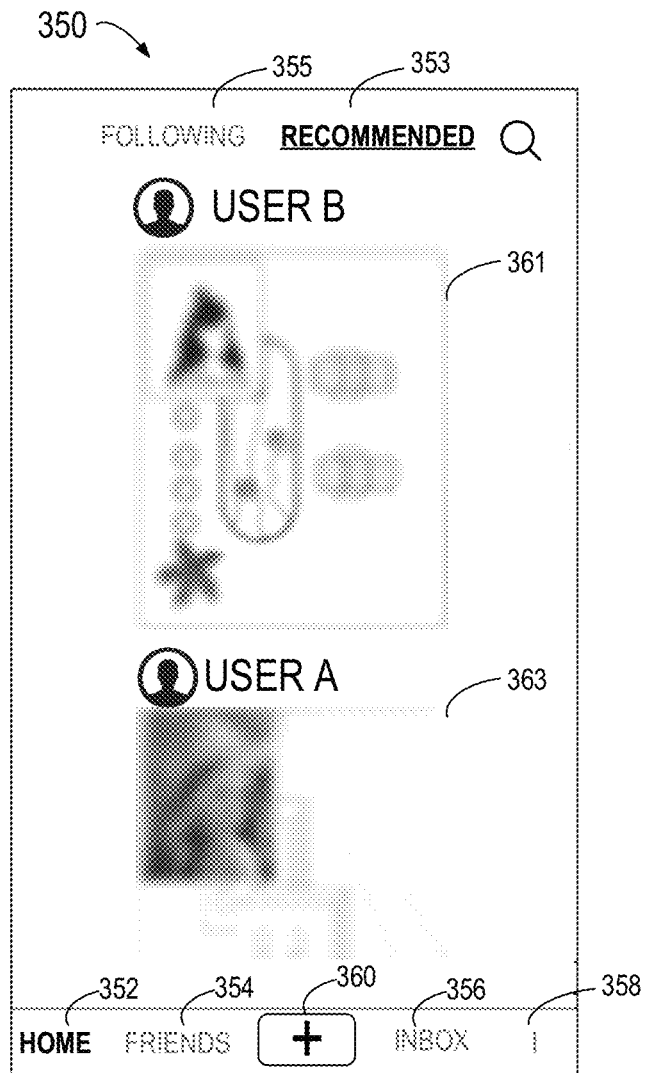
FIG. 3B illustrates a schematic view of an example page of an application according to some embodiments of the present disclosure.

FIG. 3B shows an example page 350 of the application 130 presented in the GUI. The content presentation page in which a media stream is presented. The media stream may include content 361 of user B, content 363 of user A, and the like. In the page 350, the user 140 can view the content shared by each user in the media stream through control methods such as finger up and down and page up and down. It is to be understood that the user 140 can also use other control methods, such as voice control, key control, etc., to view the media stream.

As described above, if the user 140-1 accesses the first content shared by the user 140-2 in the media stream, the terminal device 120 detects a request for the first content associated with the user 140-2 to the user 140-1. If the user 140-1 does not provide the shared second content, the terminal device 120 will present the blurred image associated with the first content to the user 140-1 in the GUI. Alternatively, or in addition, in some embodiments, as shown in FIG. 3B, if the user 140-1 does not share the second content, the content shared by other users seen by the user 140-1 in the media stream may also be a blurred image of the shared content. In addition, in some embodiments, the profile pictures of other users seen by the user 140-1 in the media stream may also be blurred profile pictures.

In some embodiments, the page 350 presents a shooting start control 360 for shooting the shared content. For example, the shooting start control 360 may be used to enable shooting of a composite image. In addition to the shooting start control 360, the page 350 also includes navigation tab bars for navigating to various pages. A "lower navigation tab bar" in the lower part of page 360 includes navigation tabs 352, 354, 356 and 358. The navigation tag 352 has the characters "Home" indicating that the navigation tab corresponds to the home page of the application 130; the navigation tag 354 has the characters "Friends" indicating that the navigation tab corresponds to the friend content page of the application 130; the navigation tag 356 has the characters "Inbox" indicating that the navigation tab corresponds to the inbox page (also referred to as the message page) of the application 130; the navigation tag 358 has the character "I" indicating that the navigation tab corresponds to the user's personal page.

An "upper navigation tab bar" in the upper part of the page 350 includes lower-level navigation tabs of the navigation tab 322, i.e., navigation tabs 323 and 325. The navigation tag 353 has the characters "Recommended" indicating a recommended content page in which recommended content of the application 130 may be presented, and the recommended content may include a media stream. The navigation tab 355 has the characters "Following" indicating a following content page in which content of following users may be presented. The page 350 corresponds to the page of the navigation tab "Recommended" 353 under the navigation tab "Home" 352, in which the recommended content (i.e., the content 361 of the user B, the content 363 of the user A, and on the like) is presented.

It is to be understood that the page 350 of FIG. 3B and the pages in other drawings to be described later are merely example pages, and various page designs may exist in practice. Various graphical elements in the page may have different arrangements and different visual representations, where one or more of them may be omitted or replaced, and one or more other elements may further exist. Embodiments of the present disclosure are not limited in this respect. For example, an indication such as "post a shared content" may be presented on the page 350 to prompt the user 140 to take an image and post it.

Still refers to FIG. 2, alternatively, or in addition, if the terminal device 120 determines that the user 140-1 has provided the second content at block 230, the terminal device 120 may present the first content to the user 140-1 in the GUI at block 250. For example, the terminal device 120 may present the detailed content of the first content to the user 140-1 on the page of the application 130 in the GUI. Alternatively, or in addition, additional information of the first content may also be presented to the user 140-1. For example, as discussed above, the user 140-1 may post the content in response to the system message including the content posting time limit. In this example, the additional information of the first content may include information about whether the time when the user 140-1 posted the content is later than the content posting time limit, and the like.

Several examples of presenting blurred images of content shared by other users to users who do not share content have been described above with reference to FIG. 2 and FIGS. 3A to 3B. In this way, a more flexible and interesting content sharing application or content presentation application is provided. Through this rule of no sharing no viewing, users are more willing to post the shared content in order to view the shared content of other users. In this way, the user's participation and experience can be greatly improved.

In some embodiments, the user 140 may spontaneously perform content sharing via the application 130 on the terminal device 120 at any time. Alternatively, or in addition, in some embodiments, the user 140 may perform content sharing in response to receiving the prompt of content provided by the terminal device 120 to the user 140. In the embodiments of providing the prompt of content sharing to the user 140, the terminal device 120 may provide the prompt of the content sharing to the respective user 140 at different time points. In other embodiments, the plurality of terminal devices 120 may provide the prompt of content sharing to the respective users 140 in response to receiving a system message or initiating indication of the server 110 to initiate content sharing activities. Each user 140 may perform content sharing in response to the same system message or initiating indication.

Figure 4:
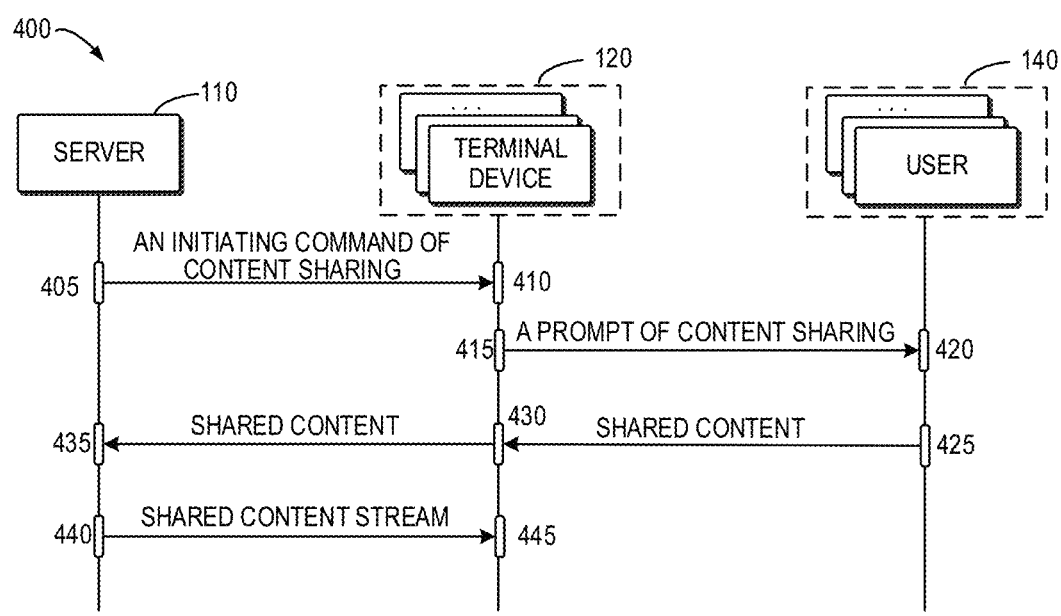
FIG. 4 illustrates a schematic diagram of an interactive process for content presentation according to some embodiments of the present disclosure.

FIG. 4 illustrates a schematic diagram of an interactive process 400 for content presentation according to some embodiments of the present disclosure. The interaction process 400 involves the server 110, the terminal device 120 and the user 140 in the environment 100. It is to be understood that the interaction process 400 may involve any number of servers 110, any number of terminal devices 120, and any number of users 140.

In operation, the server 110 may send 405 an initiating command of content sharing to a group of terminal devices 120. For example, the server 110 may send 405 the initiating command of content sharing to the group of terminal devices 120 at predetermined time intervals. For another example, the server 110 may also send 405 an initiating command of content sharing to the group of terminal devices 120 at one or more random time points every day. In some embodiments, the server 110 may simultaneously send 405 an initiating command of content sharing to each terminal device 120 located in a certain area (e.g., an area in the same time zone). Alternatively, or in addition, the server 110 may select a group of users 140 having association relationships according to the association relationships (e.g., social friend relationships) between the users 140 using the respective terminal devices 120, and simultaneously send 405 the initiating command of content sharing to the terminal devices 120 of the group of users 140.

In response to receiving 410 the initiating command of content sharing, the terminal device 120 may provide 415 a prompt of content sharing to the respective user 140 to prompt the user 140 to share the content. For example, a group of terminal devices 120 that receive the initiating command from the server 110 at the same time may respectively provide the prompt of content sharing to the respective users 140. Alternatively, or in addition, in some embodiments, the content sharing prompt may further include a content posting time limit prompt to instruct each user 140 to complete content posting within the same content posting time limit.

In this way, different users 140 can receive the content sharing prompt at almost the same time point, thereby sharing the content. In this way, different users can share content at the same random time and see the content shared by friends at the same time. For example, the user can thus see the selfie photos shared by friends at the same time. This content sharing method is more flexible and interesting, and thus improves the user's participation and experience.

In some embodiments, the terminal device 120 may provide 415 the content sharing prompt to the user 140 on different pages of the terminal device 120. FIGS. 5A to 5D show schematic views of pages that provide the prompt of content sharing to users according to some embodiments of the present disclosure. For example, the terminal device 120 may provide the content sharing prompt 510 to the user on the lock screen page 500. It is to be understood that the texts of the content sharing prompt 510 presented in FIG. 5A and below are only for the purpose of illustration, without suggesting any limitation. The content sharing prompt 510 may include any appropriate texts, symbols, expressions or pictures that prompts the user 140 to share. The content sharing prompt 510 may also be in any language.

Figure 5A:
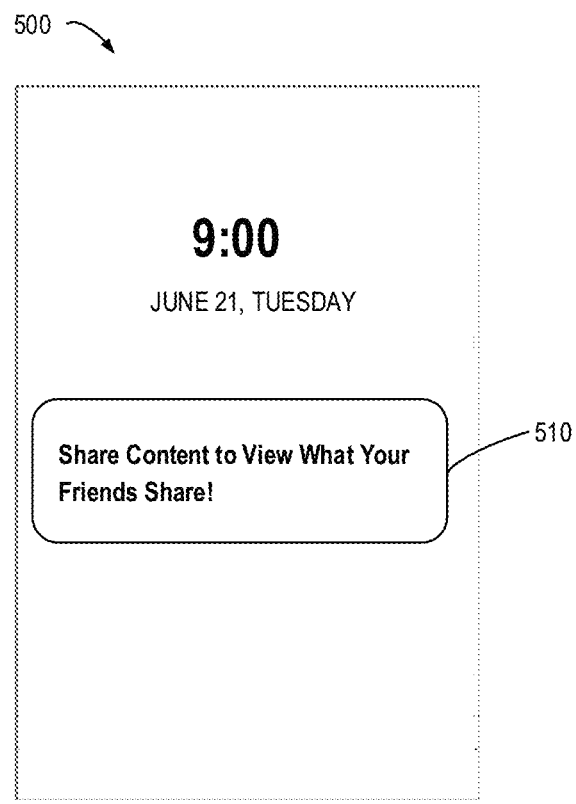
FIGS. 5A to 5D illustrate schematic diagrams of pages that push a prompt of content sharing to a user according to some embodiments of the present disclosure.
Figure 5B:
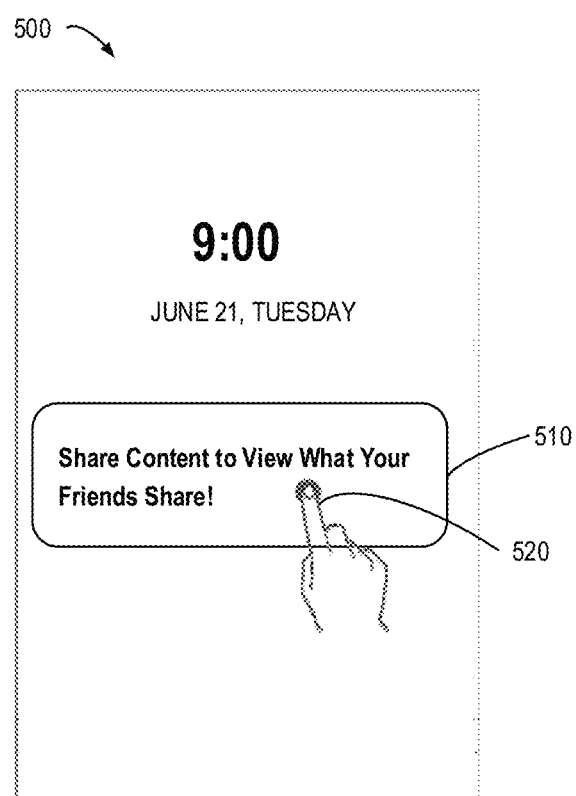

FIG. 5B shows that the user 140 clicks or touches the content sharing prompt 510 with the finger 520 to trigger the content sharing activity, for example, triggering the application 130. In response to receiving the trigger of the user 140, the terminal device 120 may launch the application 130. It is to be understood that in some embodiments, the user 140 may also trigger content sharing using a touch device, a pointing device, and the like. Embodiments of the present disclosure are not limited in this respect. It is noted that for the purpose of explanation, in FIG. 5B and some subsequent embodiments, the user selection based on the touch gesture is illustrated. However, it is to be understood that depending on the capability of the terminal device 120, there may be other ways to receive the user's selection, such as mouse selection, voice control, and the like.

Figure 5C:
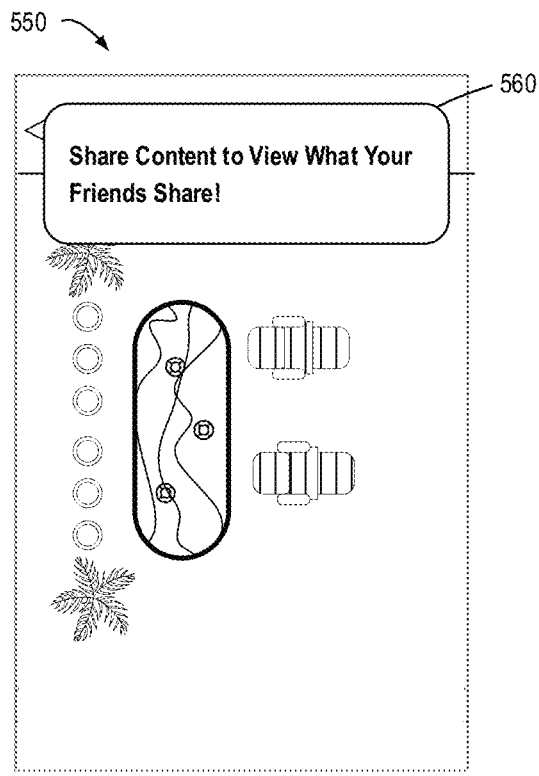
Figure 5D:
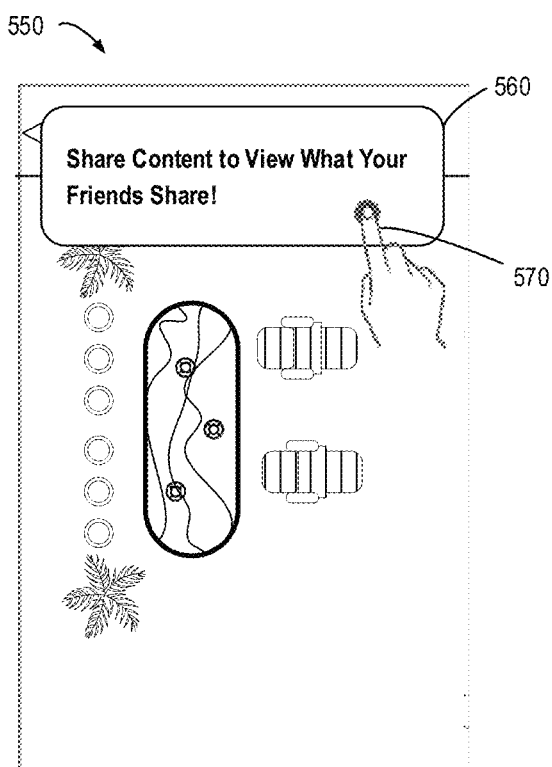

In some embodiments, the terminal device 120 may also provide 415 the content sharing prompt to the user 140 on other pages, such as the home screen page of the terminal device 120 or any page on which the terminal device 120 is running. For example, FIG. 5C shows that the terminal device 120 provides 415 the content sharing prompt 560 to the user 140 if the user 140 is viewing the page 550 including a certain screen. Similarly, in FIG. 5D, the user 140 may trigger content sharing using, for example, a finger 570. In response to receiving the trigger of the user 140, the terminal device 120 may launch the application 130.

Figure 5E:
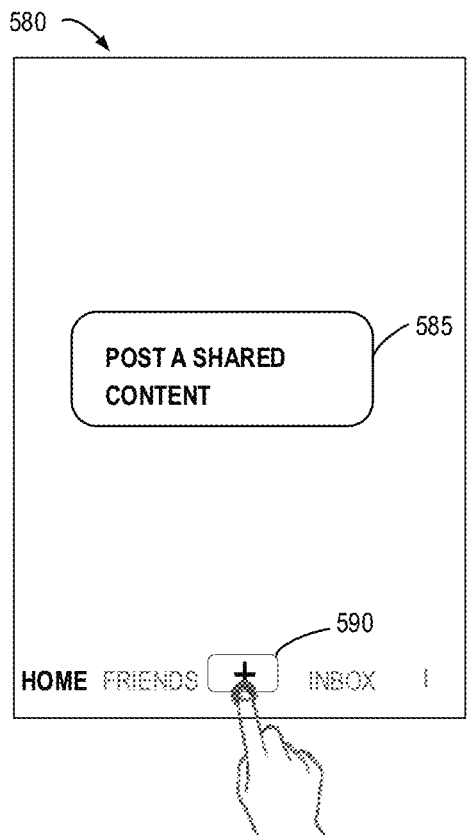
FIGS. 5E to 5F illustrate schematic diagrams of pages of a content presentation application according to some embodiments of the present disclosure.

FIG. 5E shows a schematic diagram of a page 580 of an application 130 according to some embodiments of the present disclosure. The terminal device 120 launches the application 130 and will present the page 580 of the application 130 to the user 140. The page 580 is also referred to as the home page of the application 130, for example, represented by the tab "Home" displayed at the bottom of the page. In some embodiments, a prompt such as the content sharing prompt 585 will be presented on the home page. It is to be understood that the content sharing prompt 585 presented in FIG. 5E is only for the purpose of illustration, without suggesting any limitation. The content sharing prompt 585 may include any appropriate words, symbols. The content sharing prompt 585 may also be in any language.

In some embodiments, a sharing control 590 is also presented on the page 580. If the user 140 triggers the sharing control 590 through, for example, a finger or other touch device or pointing device, the content sharing page (not shown) will be entered. On this content sharing page, the user 140 can select and input content to be shared. For example, the user 140 may select a file from a folder of the terminal device 120 or select a picture or video from an album of the terminal device 120 to share. For another example, the user 140 can shoot and edit photos or videos on the content sharing page, and upload the shot or edited content. As mentioned above, the content may include, but not limited to, video, audio, pictures, picture sets, dynamic pictures, text, and the like. The content may also be a composite content, such as a composite image shown in FIG. 3C, and the like. Embodiments of the present disclosure are not limited in this respect.

Figure 5F:
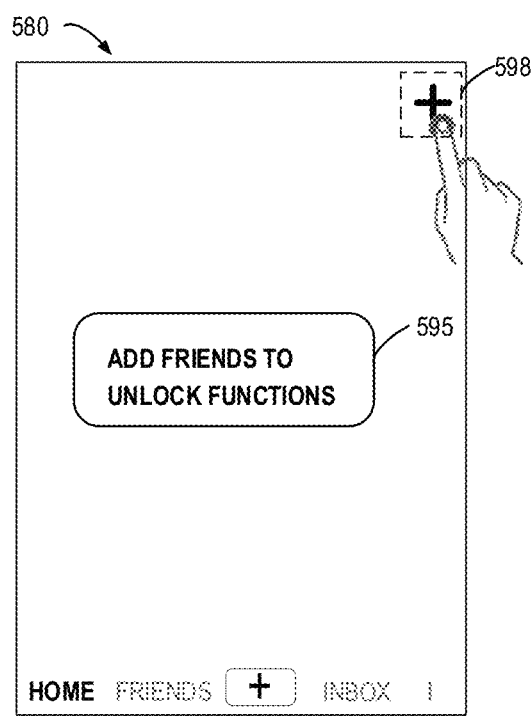

Alternatively, or in addition, the terminal device 120 may also determine the number of friends of the user 140-1. If the terminal device 120 determines that the number of friends of the user 140-1 is small, for example, less than a threshold number M (M is an integer greater than or equal to 1), the terminal device 120 may present a prompt 595 of adding friend in the page 580, as shown in FIG. 5F. The prompt 595 of adding friend prompts the user 140-1 to add more friends to unlock a corresponding system function, such as the function of the unlocking application 130. Additionally, an adding friend control 598 is also shown in the page 580 of FIG. 5F. The user 140-1 can add more friends by triggering the adding friends control 598. That is, send friend applications to other users. It is to be understood that the prompt 595 of adding friend presented in FIG. 5F is only for the purpose of illustration, without suggesting any limitation. The adding friend control 598 in FIG. 5F is also exemplary, and the adding friend control 598 may have other different shapes, positions, or layouts.

The home page of the application 130 has been described above with reference to FIGS. 5E and 5F. In some embodiments, the application 130 is provided with a friend page, a content sharing page, an inbox page, a personal page, and the like in addition to the home page. For example, the content shared by friends or the pushed media stream or shared content of non friends can be presented in the friends page. Alternatively, or in addition, recommended candidate friends may also be received on the friends page. On the content sharing page, you can create, edit, upload and delete the shared content. On the inbox page, your friends' activities, such as comments, likes, and the like may be presented. Personal information and the like can be presented on the personal page. One or more of these pages will be described below in conjunction with the accompanying drawings.

It is to be understood that the pages shown in FIGS. 5A to 5F and the pages in other drawings to be described later are merely examples, and various page designs may exist in practice. Various graphical elements in a page may have different arrangements and different visual representations, one or more of them may be omitted or replaced, and one or more other elements may also exist. Embodiments of the present disclosure are not limited in this respect. For example, in the page 580 of FIG. 5E, a return control or a close control may also be provided. The user 140 may return to the previous page by triggering the return control or close the application 130 by triggering the close control.

Stills refers to FIG. 4, the user 140 may provide 425 the shared content to the terminal device 120 in response to receiving 420 the content sharing prompt. For example, the user 140 may trigger the control 590 on the page 580 of the application 130 in FIG. 5E to enter a content sharing page, thereby providing 425 the shared content to the terminal device 120.

The terminal device 120 may upload 430 the shared content to the server 110 in response to receiving the shared content provided by the user 140. The server 110 receives 435 the shared content of the users 140 uploaded to a group of terminal devices 120. The server 110 may aggregate the content into a shared content stream or media stream, and post 440 the content stream or media stream to each terminal device 120. In some embodiments, the shared content of the user 140 uploaded by each terminal device 120 may be the content of a same content category. For example, they may all be composite images or pictures, videos, etc. Alternatively, or in addition, the shared content of these users 140 may be posted in response to the same system message (e.g., content posting indication).

The terminal device 120 may provide various interactive functions such as viewing, commenting, liking, reposting, etc. to the user 140 via the application 130 in response to receiving 445 the content stream or the media stream posted 440 by the server.

In some embodiments, in an example where each terminal device 120 provides the prompt of content sharing to the user 140, the first content that the user 140-1 wants to view may be provided by the user 140-2 in response to the prompt of content sharing provided to the user 140-1 and the user 140-2. The second content may be provided by the user 140-1 in response to the prompt of content sharing.

Figure 6:
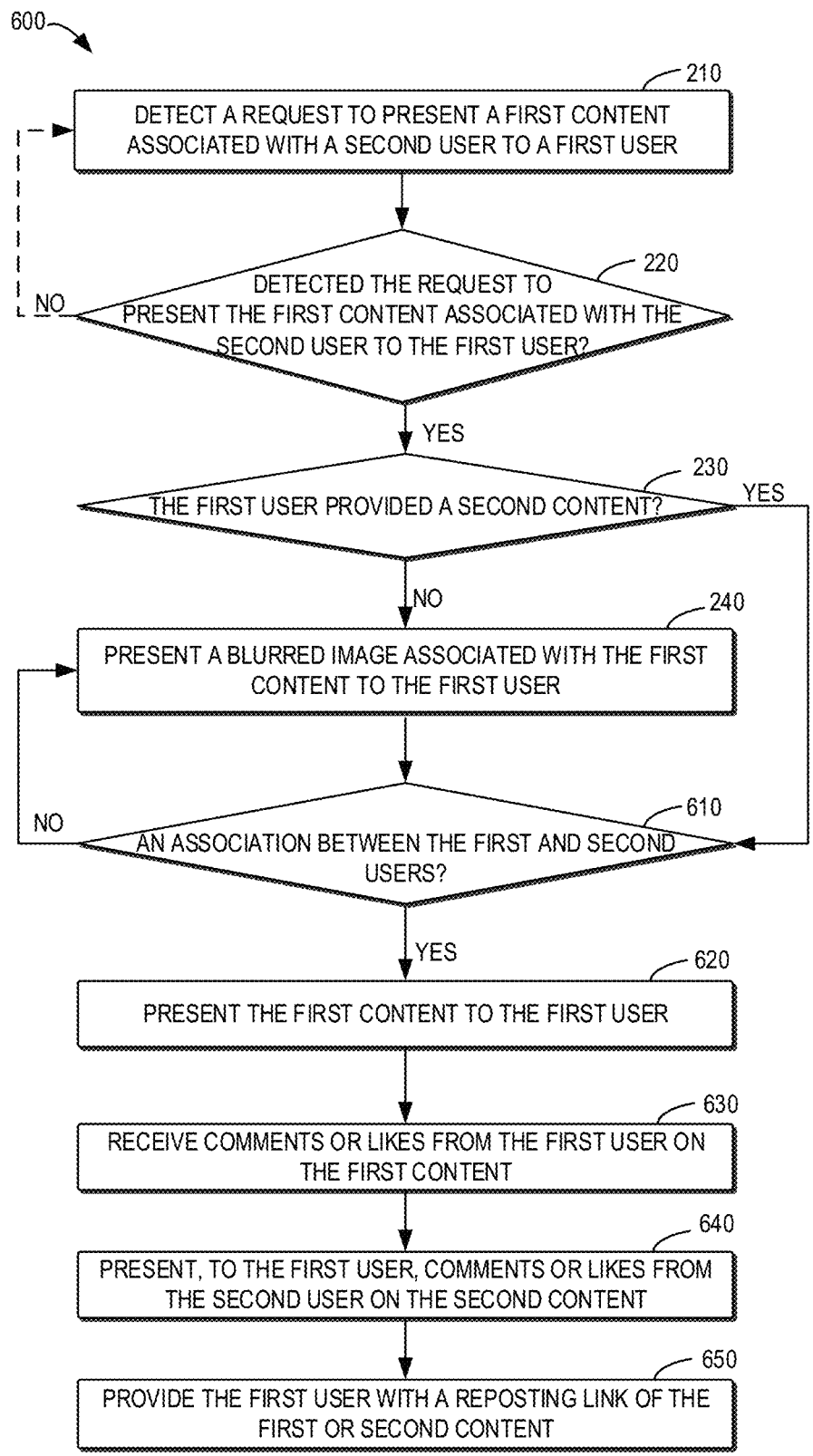
FIG. 6 illustrates a flowchart of another process for content presentation according to some embodiments of the present disclosure.

In the above, the process 200 of content sharing provided by the terminal device 120 has been described with reference to FIG. 2. In some embodiments, the terminal device 120 may also provide a process with more content sharing functions. FIG. 6 illustrates a flowchart of another process 600 for content sharing according to some embodiments of the present disclosure. Similar to the process 200, the process 600 may be implemented at the terminal device 120. For ease of discussion, process 600 will be described with reference to environment 100 of FIG. 1.

Similar to the process 200, the process 600 also includes the processes of blocks 210 to 240. These processes will not be described here. Only other additional processes are described here.

In the process 200 of FIG. 2, if the terminal device 120 determines that the user 140-1 has provided the second content at block 230, the terminal device 120 may present the first content to the user 140-1 in the GUI at block 250. Alternatively, in some embodiments, if the terminal device 120 determines at block 230 that the user 140-1 has provided the second content, the terminal device 120 may determine at block 610 whether there is an association between the user 140-1 and the user 140-2. For example, the terminal device 120 may determine whether the user 140-1 and the user 140-2 have an association in the application 130. The association may be a social friend relationship or other associations.

If the terminal device 120 determines that there is no association between the user 140-1 and the user 140-2 at block 610, the terminal device 120 may present the blurred image associated with the first content to the user 140-1 in the GUI at block 240. The first content and its associated blurred image may be as shown in FIG. 3A. Hereinafter, more examples of presenting the blurred image associated with the first content in a page of the application 130 will be described in conjunction with FIGS. 7A to 7F.

Figure 7A:
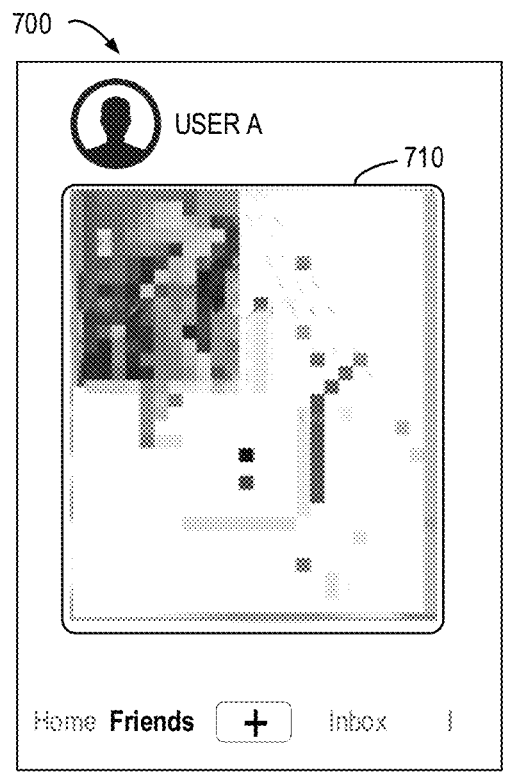
FIGS. 7A to 7F illustrate schematic diagrams of examples of presenting a blurred image of content to a user according to some embodiments of the present disclosure.
Figure 7B:
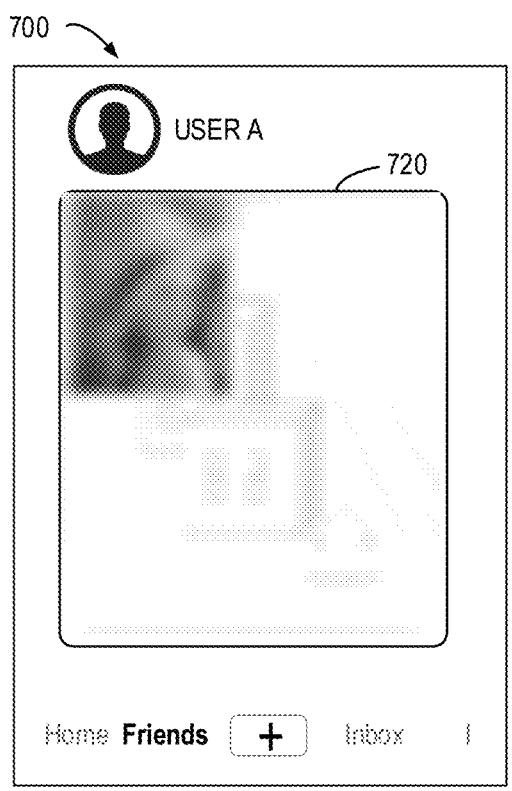
Figure 7C:
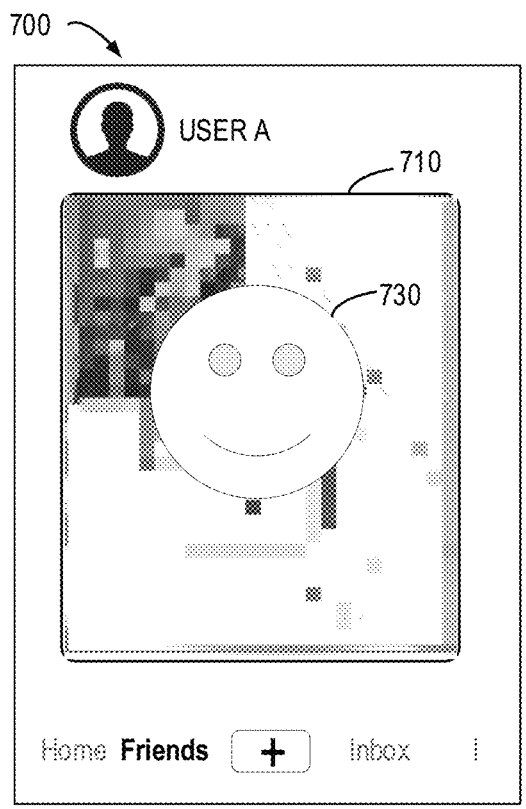

FIG. 7A shows a page 700 of the application 130. The page 700 may be presented in a friend page, for example, represented by a tab "Friends". On this page 700, the user 140-1 may want to view the first content shared by the user 140-2 (also referred to as the user A), such as the composite content 330 in FIG. 3A. In the embodiments of FIGS. 7A to 7F, unless otherwise described, the composite content 330 is described as an example of the first content. The terminal device 120 determines to present the blurred image associated with the first content to the user 140-1 through the determination in block 230 or block 610. In the example of FIG. 7A, the blurred image may include a blurred version 710 of the first content obtained by mosaic processing of the first content. Similarly, in the example of FIG. 7B, the blurred image may include a blurred version 720 of the first content obtained by blurring the first content, such as blurring the image.

Alternatively, or in addition, in some embodiments, the blurred image further includes an illustration overlapped on the blurred version of the first content. For example, in the example of FIG. 7C, the blurred image presented to the user 140-1 includes the blurred version 710 of the first content and an illustration 730. Likewise, in the example of FIG. 7D, the blurred image presented to the user 140-1 includes the blurred version 720 of the first content and an illustration 730. For purposes of explanation, a smiling face image is taken as an example of the illustration 730, but this is only exemplary. Any suitable picture may be used as an illustration. Different users 140 may use the same or different illustrations. The illustrations may be configured by the terminal system 120 or selected by the user 140.

In some embodiments, the blurred image further includes an indication about sharing the content to view the first content. Such as indication 740 in FIG. 7D. Although in the example of FIG. 7D, the blurred image includes both the illustration 730 and the indication 740, in some embodiments, the blurred image may include only one of the illustration 730 and the indication 740.

Figure 7D:
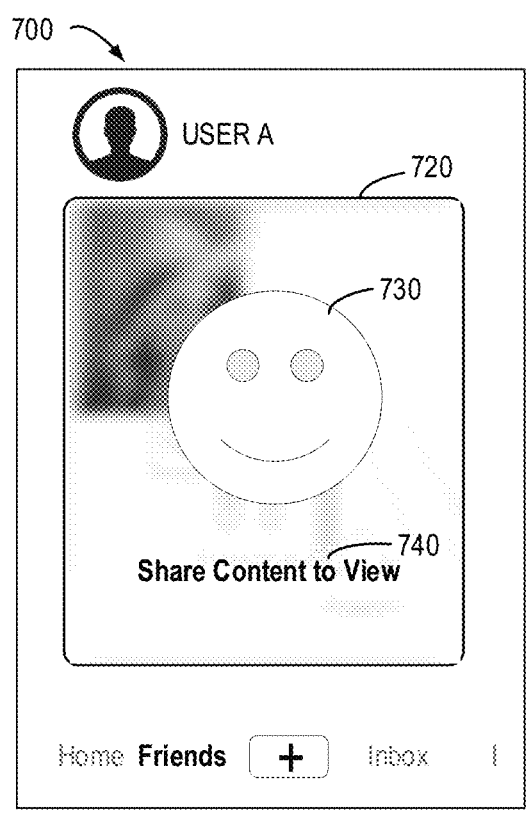
Figure 7E:
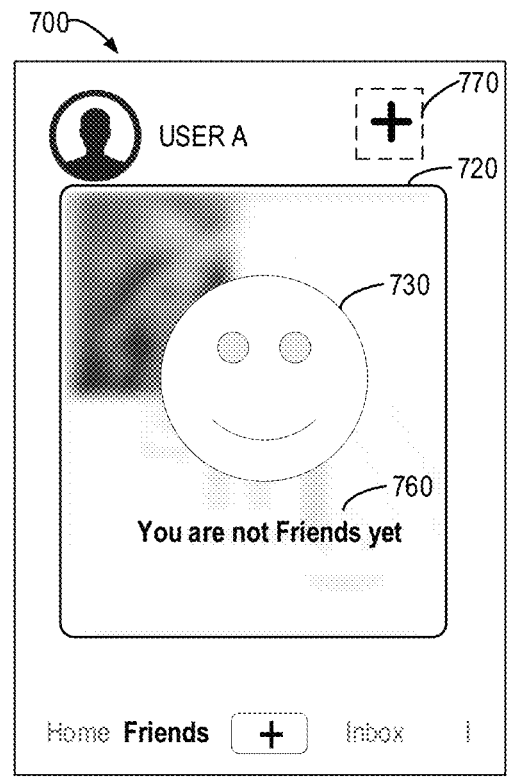
Figure 7F:
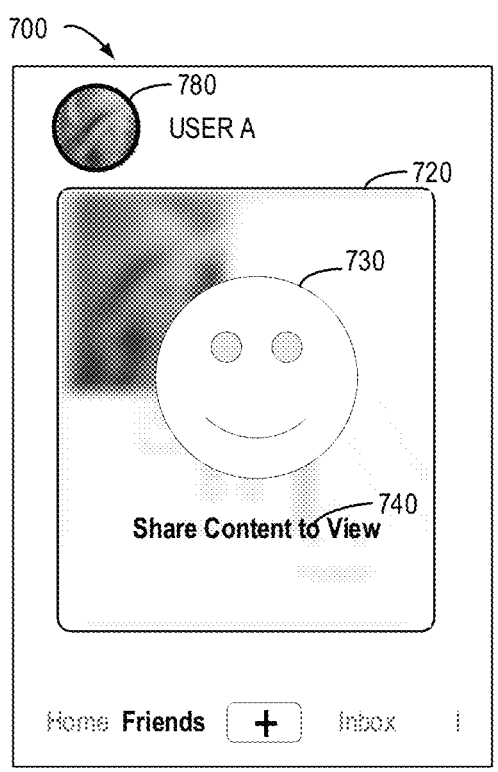

It is to be understood that the indication 740 shown in FIG. 7D is merely exemplary, and the indication 740 may present different contents. For example, in an example where it is determined at block 230 that the second content is not provided by the user 140-1, the indication 740 may indicate the content as shown in FIG. 7D, such as "Sharing Content to View". In an example where it is determined that the user 140-1 and the user 140-2 do not have an association at block 610, the indication 760 in FIG. 7E may be presented, such as "You are not Friends yet" or other similar words, expressions, and the like. Alternatively, or in addition, in an example where the user 140-1 and the user 140-2 do not have the association, the page 700 may also be provided with an adding friend control 770. If the user 140-1 triggers the adding friend control 770, a friend application can be sent to the user 140-2.

In some embodiments, if the terminal device 120 determines at block 230 that the user 140-1 does not provide the second content, the terminal device 120 may also present the blurred avatar of the user 140-2 to the user 140-1. For example, in the page 700 of FIG. 7F, it is shown that the profile picture of the user 140-2 (that is, the user A) is the blurred profile picture 780. Alternatively, or in addition, if the terminal device 120 determines at block 610 that the user 140-1 and the user 140-2 do not have the association, the profile picture of the user 140-2 presented to the user 140-1 may also be the blurred profile picture.

In some embodiments, in addition to presenting the profile picture of the user 140-2 with the blurred profile picture in the page 700, the profile picture of the user 140-2 seen at other pages, such as the friend page search box, the media stream, the friend page skylight, and the inbox, may also be the blurred profile picture. For example, if the user 140-1 receives the sharing information or reposting information about the first content of the user 140-2 sent by other users, the profile picture of the user 140-2 presented on the sharing or reposting information seen by the user 140-1 may also be a blurred profile picture. Likewise, the first content of the user 140-2 seen by the user 140-1 may be a blurred image associated with the first content.

Still refers to FIG. 6, if the terminal device 120 determines at block 610 that there is an association between the user 140-1 and the user 140-2, the terminal device 120 may present the first content to the user 140-1 in the GUI, for example, the detailed content of the first content, at block 620. Alternatively, or in addition, the terminal device 120 may also provide other interactive functions to the user 140-1. For example, at block 630, the terminal device 120 may receive comments or likes of the first content from the user 140-1. For another example, at block 640, the terminal device 120 may present comments or likes of other users (e.g., the user 140-2) on the second content provided by the user 140-1 to the user 140-1. For example, at block 650, the terminal device 120 may provide the user 140-1 with a reposting link to the first content or the second content. The various interaction processes described above will be described below with reference to FIGS. 8A to 10.

It is to be understood that although the steps are shown in a specific order in the drawings, some or all of these steps may be performed in other order or in parallel. For example, in FIG. 6, the order of block 230 and block 610 may be reversed. In other words, it is possible to first determine whether there is an association between the user 140-1 and the user 140-2, and then determine whether the user 140-1 provides the second content. As another example, block 620 may be executed in parallel with block 630. Block 640 and block 650 may be reversed. Only one or more of block 630, block 640 and block 650 may be performed. The above described interaction processes will be described in detail below in conjunction with the accompanying drawings.

Figure 8A:
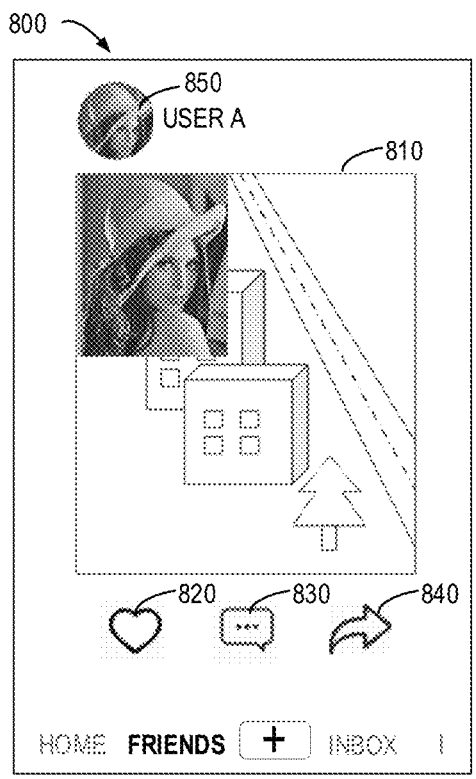
FIGS. 8A to 8F illustrate schematic diagrams of interaction examples for content presentation according to some embodiments of the present disclosure.

In the page 800 of FIG. 8A, the terminal device 120 presents the first content 810 shared by the user 140-2 to the user 140-1. Alternatively, or in addition, unlike the blurred avatar 780 presented in FIG. 7F, a clear profile picture 850 of the user 140-2 is also presented in the page 800. In some embodiments, a variety of interactive controls (also referred to as interactive icons) are also provided on the page 800, such as a like control 820, a comment control 830, a reposting control 840, and any other appropriate interactive controls (not shown).

Alternatively, or in addition, in some embodiments, the first content presented also has time information of the first content. For example, the time information may be the time when the first content is created (e.g., shot) or the time when the first content is shared. The time information may be displayed in the form of a time stamp, such as a retro postmark, or may be presented in other appropriate forms. In addition, in some embodiments, the page 800 may also show how long the time when the user shares the content is later than the time when the user receives the push. For example, if the user receives the push of the content sharing prompt at 10:00 a.m., and the user does not share the content until 2:00 p.m., the sharing being 4 hours late may be presented at an appropriate position of the page 800, such as the right side of the user's profile picture. It is to be understood that the respective times mentioned above are only for the purpose of illustration, without suggesting any limitation. The user can receive the push of the content sharing prompt at any time, and can also share the content at any time.

Figure 8B:
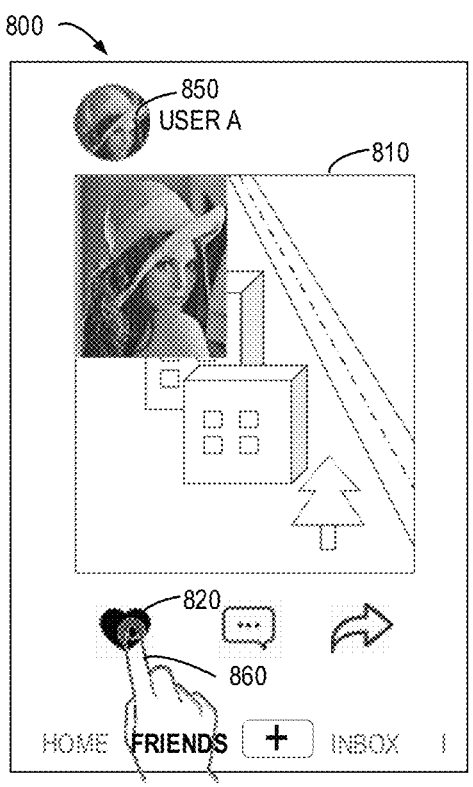

In the page 800 of FIG. 8B, the user 140-1 triggers the like control 820 by using the finger 860 or other touch device or pointing device, and then the like control 820 may become a state of eye-catching presentation, for example, displayed in red or highlighted. Additionally, in some embodiments, the like control 820 may also display the number of times the content is liked.

Figure 8C:
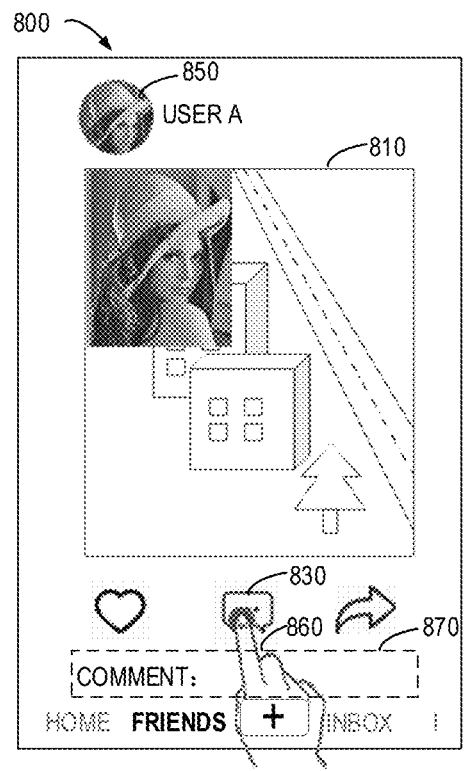

In the page 800 of FIG. 8C, if the user 140-1 triggers the comment control 830 with the finger 860 or other touch device or pointing device, the comment bar 870 may be presented on the page 800 for the user 140-1 to input comments there. Additionally, the user 140-1 triggers the comment control 830, and may also present comments of other users on the content. The user 140-1 may also reply to comments of other users.

Although in the example of FIG. 6, the user 140-1 can like or comment on the first content shared by the user 140-2 only if the user 140-1 provides the second content and has an association with the user 140-2, in some other embodiments, the user 140-1 does not need to provide the second content or have the association with the user 140-2, It is also possible to like or comment on the presented blurred image associated with the first content.

In some embodiments, the user 140-1 may send the sharing information or reposting information of the first content to a third user different from the user 140-1 and the user 140-2. The user 140-1 may also repost the sharing information sent by other users to the user 140-1 to another user. The sharing or reposting information may include a blurred image associated with the first content. Alternatively, or in addition, the user 140-1 may send the sharing or reposting information of the second content to other users. If the user receiving the sharing does not provide the sharing content, the user will see the blurred image associated with the second content.

Figure 8D:
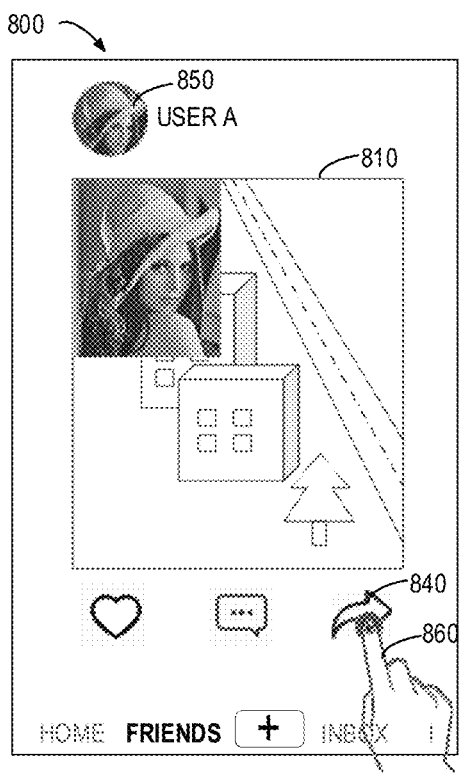
Figure 8E:
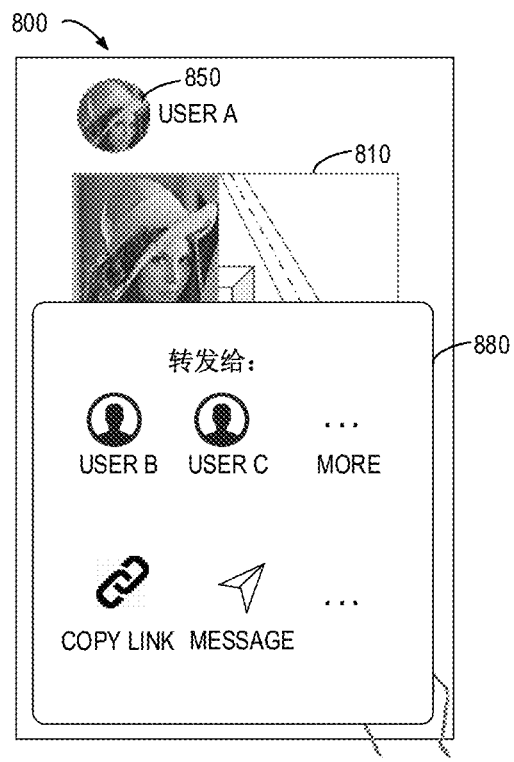

For example, in the page 800 of FIG. 8D, if the user 140-1 triggers the reposting control 840 with the finger 860 or other touch device or pointing device, the terminal device 120 may present a pop-up window, such as the pop-up window 880 in FIG. 8E. In the pop-up window 880, a variety of reposting options are presented, such as reposting to other users, reposting by copying links, reposting by messages, and so on. The methods or channels of sharing and reposting include but are not limited to reposting through private messages between friends, reposting through short messages, reposting through the 5th generation hypertext markup language (HTML) (abbreviated as H5), and the like. Embodiments of the present disclosure are not limited in this respect.

It is to be understood that the pages shown in FIGS. 8A to 8E and the pages in other drawings to be described later are merely examples, and various page designs may exist in practice. Various graphical elements in a page may have different arrangements and different visual representations, one or more of them may be omitted or replaced, and one or more other elements may also exist. For example, in some embodiments, the shape, size, and layout of the like control 820, the comment control 830, and the reposting control 840 may vary.

Figure 8F:
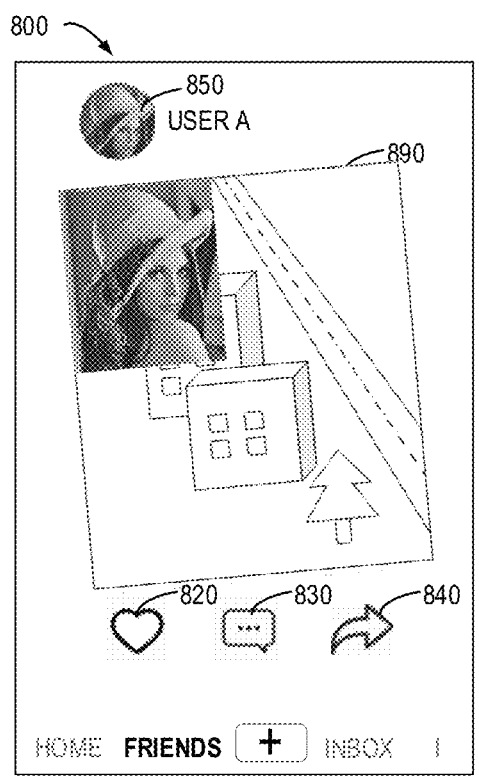

Alternatively, or in addition, in some embodiments, the layout of the first content presented in the page 800 may also be changed. FIG. 8F shows a page 800 in which the layout of the first content is changed. As illustrated, the first content 890 presented in the page 800 is rotated. It is to be understood that in addition to rotating the presented first content, any other appropriate layout changes may be made to the presented first content. For example, the first content may be presented in windows of different shapes, such as circular windows, triangular windows, etc. In some embodiments, the layout of the first content in the page may be changed according to a user command. Alternatively, or in addition, the layout of the first content in the page may be changed at predetermined time intervals according to predetermined rules.

Figure 9:
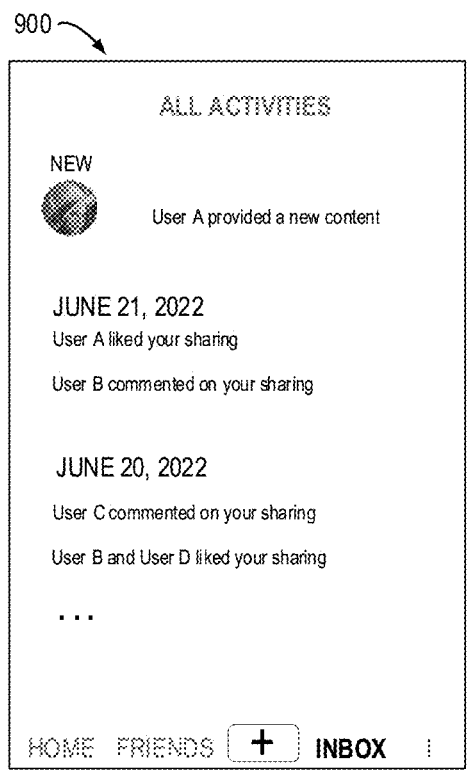
FIG. 9 illustrates a schematic diagram of an example of presenting interactive activities of other users according to some embodiments of the present disclosure.

FIG. 9 illustrates a schematic diagram of an example page 900 presenting interactive activities of other users according to some embodiments of the present disclosure. In the page 900 (also referred to as the inbox page, represented by the tab "inbox" highlighted at the bottom of the page), the activities or interactions of the friends of the user 140-1 are presented. For example, the page 900 may show that a friend (e.g., user A) has posted new content. For another example, the page 900 may also show that other users like the sharing of the user 140-1 or comment on the sharing of the user 140-1. In addition, the page 900 may also present a clear profile picture of a friend (e.g., user A) of the user 140-1. In the page 900, the user 140-1 can view and interact by clicking each activity. For example, the user 140-1 may view the comment from the user B and reply to the comment.

Although in the example of FIG. 6, the interactive activities between the user 140-2 and the user 140-1, such as likes or comments, are presented only if the user 140-1 provides the second content and has an association with the user 140-2, in some other embodiments, the user 140-1 does not need to provide the second content or the user 140-1 does not need to have an association with the user 140-2, these contents may also be presented in the page 900. The difference is that in such embodiments, the blurred profile picture of the other user may be presented in the page 900.

Figure 10:
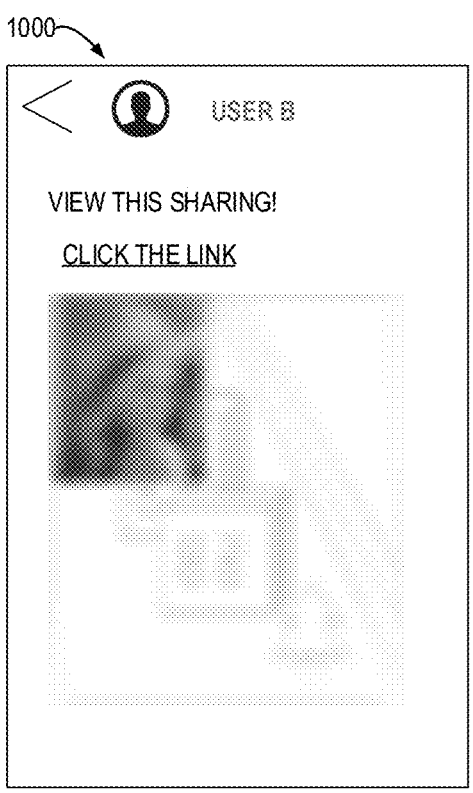
FIG. 10 illustrates a schematic diagram of an example for reposting shared content according to some embodiments of the present disclosure.

FIG. 10 illustrates a schematic diagram of an example page 1000 for reposting shared content according to some embodiments of the present disclosure. The page 1000 is also referred to as a chat page or a private message page. In the page 1000, the sharing or reposting information, such as sharing or reposting link, sent by other users, such as user B, to the user 140-1 may be presented. In some embodiments, only a user having an association with the user 140-1 may send a private message to the user 140-1. For example, a sharing link. The sharing link may be a shared content of a user (e.g., user 140-N) having no association with user 140-1. In some embodiments, if it is determined that there is no association between the user 140-N providing the content of the sharing link and the user 140-1, the shared content preview presented to the user 140-1 may be blurred, as shown in FIG. 10.

As described above, the user 140-1 may send the received sharing or reposting information to a third user. The sharing or reposting information also includes a blurred image associated with the shared content.

Various interactions on content sharing provided by the terminal device 120 have been described above with reference to FIGS. 8A to 10. These interaction methods enrich the functions of content sharing applications or content presentation applications, making these applications flexible and interesting. This can further improve the user's participation and experience.

Figure 11:
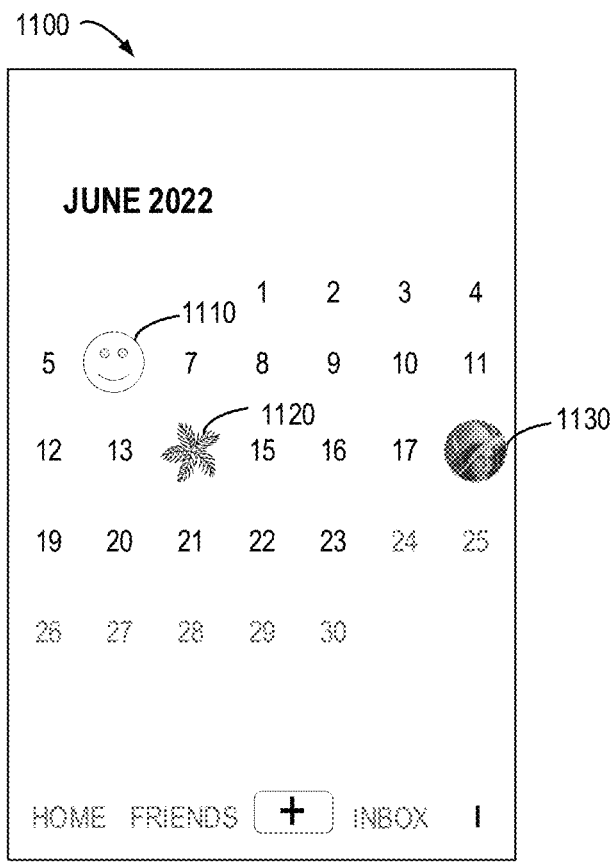
FIG. 11 illustrates a schematic diagram of an example for viewing a personal sharing record according to some embodiments of the present disclosure.

FIG. 11 illustrates a schematic diagram of an example page 1100 for viewing a personal sharing record according to some embodiments of the present disclosure. The page 1100 may be presented in a personal page, for example, represented by a tab "I". For example, the user 140-1 can view the personal sharing records for a period of time. The period of time can be a week, a month or a year, and so on. In FIG. 11, taking a month as an example, the personal sharing records of the user 140-1 in that month is shown. In FIG. 11, the date that the current month has passed is shown in bold numerals, and the date that has not yet been reached is shown in light gray numerals.

In some embodiments, if the user 140-1 shares content on a certain date, an illustration, such as a smiling face illustration 1110, may be used in the page 1100 to indicate that content is shared on that date. The user 140-1 may trigger the smiling face illustration 1110 by, for example, clicking with a finger or other triggering methods to jump to the page where the content is presented. Alternatively, or in addition, if the user 140-1 shares the content on a certain date, the preview or thumbnail of the shared content, such as the picture 1120, may be displayed on the page 1100 to indicate that the content is shared on that date. The user 140-1 may trigger the picture 1120 by, for example, a finger clicking or other triggering methods to jump to the page where the content is presented. In some embodiments, if the user 140-1 shares content on a certain date, the profile picture of the user, such as the profile picture 1130, may be displayed on the page 1100 to indicate that content is shared on that date. The user 140-1 may trigger the profile picture 1130 by, for example, a finger clicking or other triggering methods to jump to the page where the content is presented.

In this way, the user 140 can review the content that he or she has shared in the past period of time. In some embodiments, the user 140 may make settings so that the content sharing record can only be viewed by the user 140 himself or herself Alternatively, or in addition, the user 140 may also share his or her own content sharing record with others for viewing. In this way, the user 140 can also view past shared content, thereby making sharing more meaningful.

Figure 12:
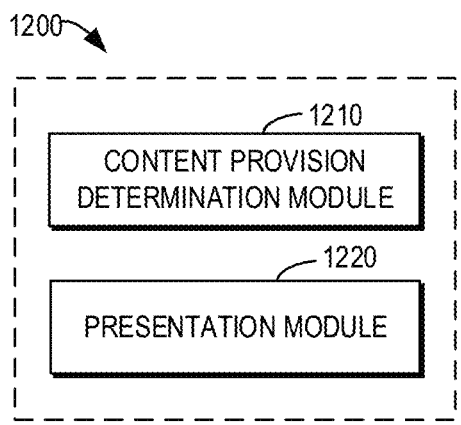
FIG. 12 illustrates a block diagram of an apparatus for content presentation according to some embodiments of the present disclosure.

FIG. 12 shows a block diagram of an apparatus 1200 for content presentation according to some embodiments of the present disclosure. The apparatus 1200 may be implemented or included in the terminal device 120. The various modules/components in the apparatus 1200 may be implemented by hardware, software, firmware, or any combination of thereof.

As shown, the apparatus 1200 includes a content provision determination module 1210 configured to based on a first user input received in a graphical user interface, the first user input indicating to present a first content associated with a second user (e.g., user 140-1) to a first user (e.g., user 140-1) in the graphical user interface, determine whether the first user has provided the second content. The apparatus 1200 further includes a presentation module 1220 configured to present a blurred image associated with the first content to the first user in the graphical user interface if the first user does not provide the second content.

In some embodiments, the blurred image comprises at least a blurred version of the first content obtained by the first content through a blurring or the mosaic processing. Alternatively, or in addition, in some embodiments, the blurred image further comprises at least one of an illustration overlapped on the blurred version of the first content; or an indication about sharing content to view the first content.

In some embodiments, the second and first contents may be content of a same content category. Alternatively, or in addition, the second and first contents may be posted in response to a same system message. In some embodiments, the system message comprises a prompt of content posting time limit. The prompt of content posting time limit is used to indicate the user to post the content within the content posting time limit.

In some embodiments, the apparatus 1200 further includes a first content presentation module configured to present the first content to the first user if the first user has provided the second content. Alternatively, or in addition, in some embodiments, the apparatus 1200 further includes an enabling module configured to, in response to determining that the first user has provided the second content, enable the first user to further perform at least one of: viewing the detailed content of the first content; commenting on or liking the first content; viewing comments or likes of other users on the second content shared by the first user; or sending a link of the first content or the second content to other users.

In some embodiments, the apparatus 1200 further includes an association determination module configured to determine whether an association exists between the first and second users in response to determining that the first user has provided the second content. The apparatus 1200 further includes a second blurred image presentation module configured to present a blurred image associated with the first content to the first user if there is no association between the first and second users.

In some embodiments, the apparatus 1200 further includes a blurred profile picture presentation module configured to present the blurred profile picture of the second user to the first user if the first user does not provide the second content.

In some embodiments, the apparatus 1200 further includes a friend number determination module configured to determine whether a number of friends of the first user reaches a threshold number. The apparatus 1200 further comprises an unlocking indication module configured to in response to determining that the number of friends of the first user does not reach the threshold number, send an indication to the first user that it is necessary to add friends to unlock a corresponding system function.

In some embodiments, the first content and/or the second content comprise a composite content. The composite content is obtained by composing the picture or video taken by the front camera and the picture or video taken by the rear camera.

In some embodiments, presenting the first content associated with the second user to the first user includes at least one of the following situations: the first user accessing the first content in the media stream; the first user receiving reposting information corresponding to the first content; the first user receiving sharing information corresponding to the first content; or the first user receiving system information corresponding to the first content.

In some embodiments, the apparatus 1200 further includes a sharing and reposting module configured to send the sharing or reposting information of the first content to a third user different from the first and second users. The sharing or reposting information includes the blurred image associated with the first content.

Figure 13:
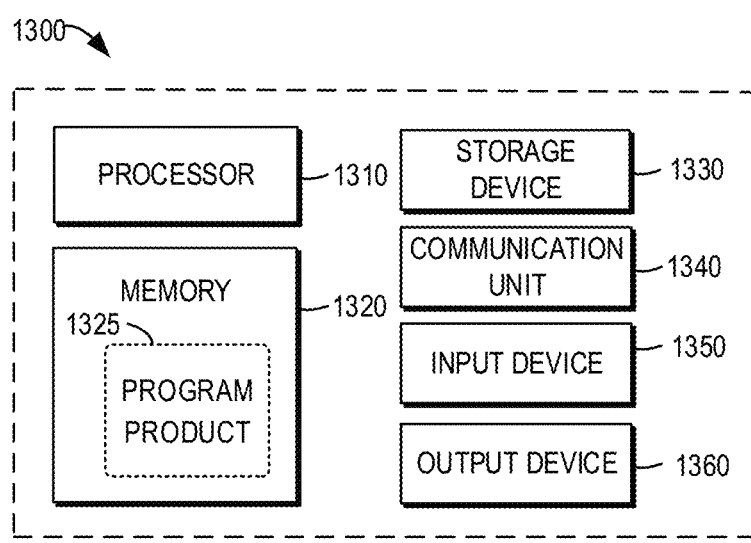
FIG. 13 illustrates an electronic device in which one or more embodiments of the present disclosure can be implemented.

FIG. 13 illustrates a block diagram of an electronic device 1300 in which one or more embodiments of the present disclosure can be implemented. It is to be understood that the electronic device 1300 as shown in FIG. 13 is merely provided as an example, without suggesting any limitation to the functionalities and scope of the embodiments described herein. The electronic device 1300 shown in FIG. 13 may be used to implement the terminal device 120 of FIG. 1.

As shown in FIG. 13, the electronic device 1300 is in the form of a general-purpose electronic device. Components of the electronic device 1300 may include, without limitation to, one or more processors or processing units 1310, a memory 1320, a storage device 1330, one or more communication units 1340, one or more input devices 1350 as well as one or more output devices 1360. The processing unit 1310 may be a real or virtual processor and can execute various processing according to programs stored in the memory 1320. In a multi-processor system, a plurality of processing units execute in parallel computer-executable instructions to increase the parallel processing capability of the electronic device 1300.

The electronic device 1300 usually includes various computer storage media. Such media may be any available media accessible by the electronic device 1300, including but not limited to, volatile and non-volatile media, or detachable and non-detachable media. The memory 1320 may be a volatile memory (for example, a register, cache, Random Access Memory (RAM)), non-volatile memory (for example, a Read-Only Memory (ROM), Electrically Erasable Programmable Read-Only Memory (EEPROM), a flash memory), or any combination thereof. The storage device 1330 may be any detachable or non-detachable medium and may include machine-readable medium such as a flash memory drive, a magnetic disk or any other media that can be used for storing information and/or data (e.g., training data for training) and are accessible within the electronic device 1300.

The electronic device 1300 may further include additional detachable/non-detachable, volatile/non-volatile memory media. Although not shown in FIG. 13, there may be provided a disk drive for reading from or writing into a detachable and non-volatile disk (e.g., a floppy disk), and an optical disk drive for reading from and writing into a detachable non-volatile optical disk. In such cases, each drive may be connected to a bus (not shown) via one or more data medium interfaces. The memory 1320 may include a computer program product 1325 having one or more program modules which are configured to perform various methods or acts according to various embodiments of the present disclosure.

The communication unit 1340 implements communication with another computing device via the communication medium. In addition, the functionalities of components in the electronic device 1300 may be implemented by a single computing cluster or a plurality of computing machines that can communicate with each other via communication connections. Thus, the electronic device 1300 may operate in a networked environment using a logic connection with one or more other servers, network personal computers (PCs), or further general network nodes.

The input device 1350 may include one or more of a variety of input devices, such as a mouse, keyboard, trackball and the like. The output device 1360 may be one or more output devices, such as a display, loudspeaker, printer and the like. By means of the communication unit 1340, the electronic device 1300 may further communicate with one or more external devices (not shown) such as storage devices and display devices, one or more devices that enable the user to interact with the electronic device 1300, or any devices (such as a network card, a modem and the like) that enable the electronic device 1300 to communicate with one or more other computing devices, if required. Such communication may be performed via input/output (I/O) interfaces (not shown).

The electronic device 1300 may further be provided with a plurality of cameras, e.g., the first camera and the second camera. The first camera and the second camera may communicate with other component of the electronic device 1300 or an external device via the communication unit 1340.

According to example implementations of the present disclosure, there is provided a computer-readable storage medium with computer-executable instructions stored thereon, wherein the computer-executable instructions are executed by a processor to realize the methods described above. According to example implementations of the present disclosure, there is further provided there is provided a computer program product tangibly stored on a non-transient computer-readable medium and comprising computer-executable instructions which are executed by a processor to realize the methods described above.

Aspects of the present disclosure are described herein with reference to flowchart illustrations and/or block diagrams of methods, apparatus (systems), and computer program products according to implementations of the present disclosure. It will be understood that each block of the flowchart illustrations and/or block diagrams, and combinations of blocks in the flowchart illustrations and/or block diagrams, can be implemented by computer-readable program instructions.

These computer readable program instructions may be provided to a processing unit of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present disclosure have been presented for purposes of illustration, but are not intended to be exhaustive or limited to implementations disclosed. Many modifications and variations will be apparent to those of ordinary skill in the art without departing from the scope and spirit of the described implementations. The terminology used herein was chosen to best explain the principles of implementations, the practical application or technical improvement over technologies found in the marketplace, or to enable others of ordinary skill in the art to understand implementations disclosed herein.

We claim:

1. A method for content displaying, comprising:
   receiving, at a graphical user interface from a first user, a first user request to display a first content in a content sharing application associated with the first user and a second user, the first content being posted by the second user to the content sharing application in response to a system message, the system message comprising a prompt of content posting time limit used to indicate a user to post content within the content posting time limit, wherein the system message is transmitted to a plurality of devices of a plurality of users at least comprising the first user;
   determining, by a processor, whether the content sharing application receives a second content posted by the first user in response to the system message, the second content comprising a multimedia content;
   in accordance with a determination that the content sharing application does not receive the second content, displaying a blurred image associated with the first content in the graphical user interface; and
   in accordance with a determination that the content sharing application receives the second content, displaying the first content in the graphical user interface.

2. The method according to claim 1, wherein the blurred image comprises at least a blurred version of the first content obtained by a blur or mosaic processing on the first content.

3. The method according to claim 2, wherein the blurred image further comprises at least one of the following:
   an illustration overlapped on the blurred version of the first content; or
   an indication of sharing content to view the first content.

4. The method according to claim 1, wherein the first and second contents belong to a same category.

5. The method according to claim 1, further comprising:
   in accordance with a determination that the content sharing application receives the second content, enabling at least one of the following operations associated with the content sharing application:
   viewing details of the first content;
   commenting on the first content or liking the first content;
   viewing comments or likes from other users on the second content shared by the first user; or
   sending a link of the first or second content to another user.

6. The method according to claim 1, further comprising:
   in accordance with a determination that the content sharing application receives the second content, determining, by the processor, whether there is an association between the first and second users in the content sharing application; and
   in accordance with a determination that there is no association between the first and second users, displaying a blurred image associated with the first content in the graphical user interface.

7. The method according to claim 1, further comprising:
   in accordance with a determination that there is no association between the first and second users, displaying a blurred profile picture of the second user in the graphical user interface.

8. The method according to claim 1, further comprising:
   determining, by the processor, whether a number of friends of the first user in the content sharing application reaches a threshold number; and
   in accordance with a determination that the number of friends of the first user does not reach the threshold number, displaying an indication in the graphical user interface the indication indicative of adding friends to unlock a corresponding system function.

9. The method according to claim 1, wherein the first content and/or the second content comprises a composite content obtained by composing a picture or video taken by a front camera and a picture or video taken by a rear camera.

10. The method according to claim 1, wherein displaying the first content associated with the second user comprises at least one of the following situations:
    the first user accessing the first content in a media stream;
    the first user receiving reposting information corresponding to the first content;

the first user receiving sharing information corresponding to the first content; or the first user receiving system information corresponding to the first content.

11. The method according to claim 10, further comprising:

causing, by the processor, sharing or reposting information of the first content to be sent to a third user different from the first and second users, the sharing or reposting information comprising a blurred image associated with the first content.

12. The method of claim 1, further comprising:

displaying time information of the first content in the graphic user interface, wherein the time information comprises at least one of: a time point at which the first content is created or shot, a time point at which the first content is posted to the content sharing application, a time length from an ending time of the content posting time limit to the time point at which the first content is posted to the content sharing application.

13. An electronic device, comprising:

at least one processing unit;

a display device; and at least one memory, coupled to the at least one processing unit and storing instructions to be executed by the at least one processing unit, the instructions, when executed by the at least one processing unit, causing the electronic device to:

receive, from a first user, a first user request to display a first content in a content sharing application associated with the first user and a second user, the first content being posted by the second user to the content sharing application in response to a system message, the system message comprising a prompt of content posting time limit used to indicate a user to post content within the content posting time limit, wherein the system message is transmitted to a plurality of devices of a plurality of users at least comprising the first user;

determine, by the at least one processing unit, whether the content sharing application receives a second content posted by the first user in response to the system message, the second content comprising a multimedia content;

in accordance with a determination that the content sharing application does not receive the second content, display a blurred image associated with the first content by the display device, and in accordance with a determination that the content sharing application receives the second content, display the first content in the graphical user interface.

14. A non-transitory computer-readable storage medium, with a computer program stored thereon, the computer program being executable by a processor to implement a method for content displaying, the method comprising:

receiving, at a graphical user interface from a first user, a first user request to display a first content in a content sharing application associated with the first user and a second user, the first content being posted by the second user to the content sharing application in response to a system message, the system message comprising a prompt of content posting time limit used to indicate a user to post content within the content posting time limit, wherein the system message is transmitted to a plurality of devices of a plurality of users at least comprising the first user;

determining, by the processor, whether the content sharing application receives a second content posted by the first user in response to the system message, the second content comprising a multimedia content;

in accordance with a determination that the content sharing application does not receive the second content, displaying a blurred image associated with the first content in the graphical user interface, and in accordance with a determination that the content sharing application receives the second content, displaying the first content in the graphical user interface.

* * * * *